US008868499B2

(12) United States Patent
Barker et al.

(10) Patent No.: US 8,868,499 B2
(45) Date of Patent: Oct. 21, 2014

(54) METHOD AND SYSTEM FOR PUSHING DATA TO SUBSCRIBERS IN AN ON-DEMAND SERVICE

(75) Inventors: Timothy J Barker, San Francisco, CA (US); Ryan Lissack, San Francisco, CA (US); Daniel L Pletter, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 1816 days.

(21) Appl. No.: 11/893,617

(22) Filed: Aug. 15, 2007

(65) Prior Publication Data

US 2009/0049053 A1 Feb. 19, 2009

(51) Int. Cl.
*G06F 7/00* (2006.01)
*G06F 17/00* (2006.01)
*G06F 17/30* (2006.01)

(52) U.S. Cl.
CPC .... *G06F 17/30011* (2013.01); *G06F 17/30368* (2013.01); *G06F 17/30348* (2013.01); *G06F 17/3056* (2013.01)
USPC ............ 707/626; 707/627; 707/628; 707/632

(58) Field of Classification Search
USPC .................................. 707/626, 627, 628, 632
See application file for complete search history.

(56) References Cited

U.S. PATENT DOCUMENTS

| 6,029,175 | A  | * | 2/2000  | Chow et al. ........................... 1/1 |
| 7,577,706 | B2 | * | 8/2009  | Arregui et al. ................ 709/206 |
| 2001/0049819 | A1 | * | 12/2001 | Pereboom ........................ 717/11 |
| 2004/0002988 | A1 | * | 1/2004  | Seshadri et al. .............. 707/102 |
| 2004/0230903 | A1 | * | 11/2004 | Elza et al. ...................... 715/513 |
| 2005/0010635 | A1 | * | 1/2005  | Schwesig et al. ............. 709/203 |
| 2007/0060099 | A1 | * | 3/2007  | Ramer et al. .................. 455/405 |
| 2007/0100960 | A1 | * | 5/2007  | Eichstaedt et al. ............ 709/217 |

OTHER PUBLICATIONS

Title: "NextPage", Date: Jul. 6, 2006 URL: http://web.archive.org/web/20060706184011/http://nextpage.com/, Company Address: NextPage Global Headquarters, 13997 South Minuteman Drive, Draper, UT 84020 (No. of pp. 6).

* cited by examiner

*Primary Examiner* — Rehana Perveen
*Assistant Examiner* — Huen Wong
(74) *Attorney, Agent, or Firm* — Dergosits & Noah LLP; Todd A. Noah

(57) ABSTRACT

In accordance with embodiments, there are provided mechanisms and methods for pushing data, which maybe associated with documents that are being tracked, in an on-demand service. These mechanisms and methods for pushing data in an on-demand service can enable subscriptions to elements associated with the documents being shared. As a result of the subscription the user may be notified that a document associated with the subscription has been changed (e.g., altered). In an embodiment, the subscription may be forced on a user.

45 Claims, 26 Drawing Sheets

METHOD AND SYSTEM FOR PUSHING DATA TO SUBSCRIBERS IN AN ON-DEMAND SERVICE

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/825,393 entitled SYSTEM AND METHOD FOR TRACKING DOCUMENTS IN AN ON-DEMAND SERVICE, by Timothy Barker et al., filed Jul. 6, 2007;

U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007; and U.S. patent application Ser. No. 11/893,617 entitled METHOD AND SYSTEM FOR PUSHING DATA TO SUBSCRIBERS IN AN ON-DEMAND SERVICE, by Timothy Barker et al., filed Aug. 15, 2007;

U.S. patent application Ser. No. 11/879,535 entitled SYSTEM AND METHOD FOR TRACKING DOCUMENTS IN AN ON-DEMAND SERVICE, by Timothy Barker et al., filed Jul. 17, 2007;

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to sharing documents in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional document management systems, users access their documents stored in one logical storage space. A user of such a conventional system typically retrieves documents from, and stores documents on, the system using the user's own systems. A user system might remotely access one of a plurality of server systems that might in turn access the document management system. Document retrieval from the system might include the issuance of a query from the user system to the document management system. The document management system might process such a request received in the form of a query and might send to the user system information about documents stored in the document management system that are relevant to the request. The ability to share documents among multiple individuals, the ability to provide the retrieval of accurate information relating the shared documents, and the ability to deliver this information to the user system are desirable characteristics of document management systems in general.

Unfortunately, such conventional approaches suffer from the flaw that, when updating files in the document storage management system, users must select to send messages to a potentially large number of other users, many of whom will have no immediate interest in knowing that the file has been updated. Additionally, some of the users updating the document may be unaware of other users that need a copy of the document and consequently do not know to send these other users a copy of the update. Thus, these conventional approaches become cumbersome as the number of documents and users grow in the system, and in some cases a user may not be aware of some documents that are important for them to monitor the latest updates.

Accordingly, it is desirable to provide improved techniques enabling the sharing of documents of the document management system.

BRIEF SUMMARY

In accordance with embodiments, there are provided mechanisms and methods for pushing data to subscribers in an on-demand service. These mechanisms and methods for pushing data to subscribers in an on-demand service can enable embodiments to provide the capability to subscribe to shared documents. The subscription may be for documents that are shared in a manner such that changes to the document are tracked as a safeguard that allows a user to know, whether the document that they have in their possession is the most recent version. In an embodiment and by way of example, a method for subscribing documents that are shared by a plurality of users on behalf of a plurality of organizations is provided.

In an embodiment, after the user joins the group, documents may be downloaded from the document management storage into the user's system (e.g., into the user's desktop). In an embodiment, when a user opens one of the documents that was downloaded from the document management storage, a check is performed to determine whether the document opened is the most recent version. This check may be performed in an embodiment by comparing unique identifiers of the two copies of the document (e.g., the copy residing on the user's desktop and the copy stored by the document management system). In an embodiment, if the user's copy of the document is not the most recent version, a message may be sent to the user asking if the user wants to have the user's copy updated. In this specification, the terms "up-to-date," "current," and "most recent version" may be used interchangeably to describe various example embodiments and not as limitations.

In an embodiment, an identifier includes an identification portion, and also includes a hashed version of content of the document with which the identifier is associated. The identification portion may be used to identify that two documents at least originated from the same document, but possibly are different versions of the same document. The hashed content may be used to check whether there has been a change in content.

In an embodiment, the user can initiate a subscription via a single click. As a result of the subscription, the user receives updates to the item for which the subscription pertains. A copy of the original document may be stored to document management storage in association with a tag. The subscription may pertain to a particular document, documents having a particular author, or documents having a particular tag (a keyword or a topic). Thus, if the subscription is a document, every time the document is updated, the update is sent or a message that an update is available is sent to the subscriber. Some users may be forced to subscribe (e.g., as a default) to certain documents or to all documents of one or more workspaces or document management storages. For example, every member of a particular organization may be given a subscription to a certain set of tags upon entry to the system. Consequently, administrators can ensure that members of the user group are aware of changes to documents that the administrator believes to be important. The updates associated with the subscription may be provided via a Really Simple Syndication (RSS) feed. The subscription messages may be collected into batches and sent in a batch periodically at particular times (e.g., once nightly).

While the present invention is described with reference to an embodiment in which techniques for pushing data to subscribers in an on-demand service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 11 illustrates a screenshot of an example of a subscriptions page including document subscriptions;

FIG. 12 illustrates a screenshot of an example of a subscription page including tag subscriptions;

FIG. 13 illustrates a screenshot of an example of a subscription page including author subscriptions;

FIG. 14 illustrates a screenshot of an example of a subscription page including workspace subscriptions;

FIG. 15 illustrates a screenshot of an example of a settings page including user details;

FIG. 16 illustrates a screenshot of a settings page including notification settings;

FIG. 17 illustrates a screenshot of a settings page including user administration settings;

FIG. 18 illustrates a screenshot of a settings page including invite settings;

FIG. 19 illustrates a screenshot of a settings page including profile administration settings;

FIG. 20 illustrates a screenshot of a settings page including add profile roles settings;

FIG. 21 illustrates a screenshot of a settings page including add profile actions settings;

FIG. 22 illustrates a screenshot of a settings page including role administration settings;

FIG. 23 illustrates a screenshot of a settings page including add role settings;

FIG. 24 illustrates a screenshot of a settings page including document type settings;

DETAILED DESCRIPTION

Figure 1:
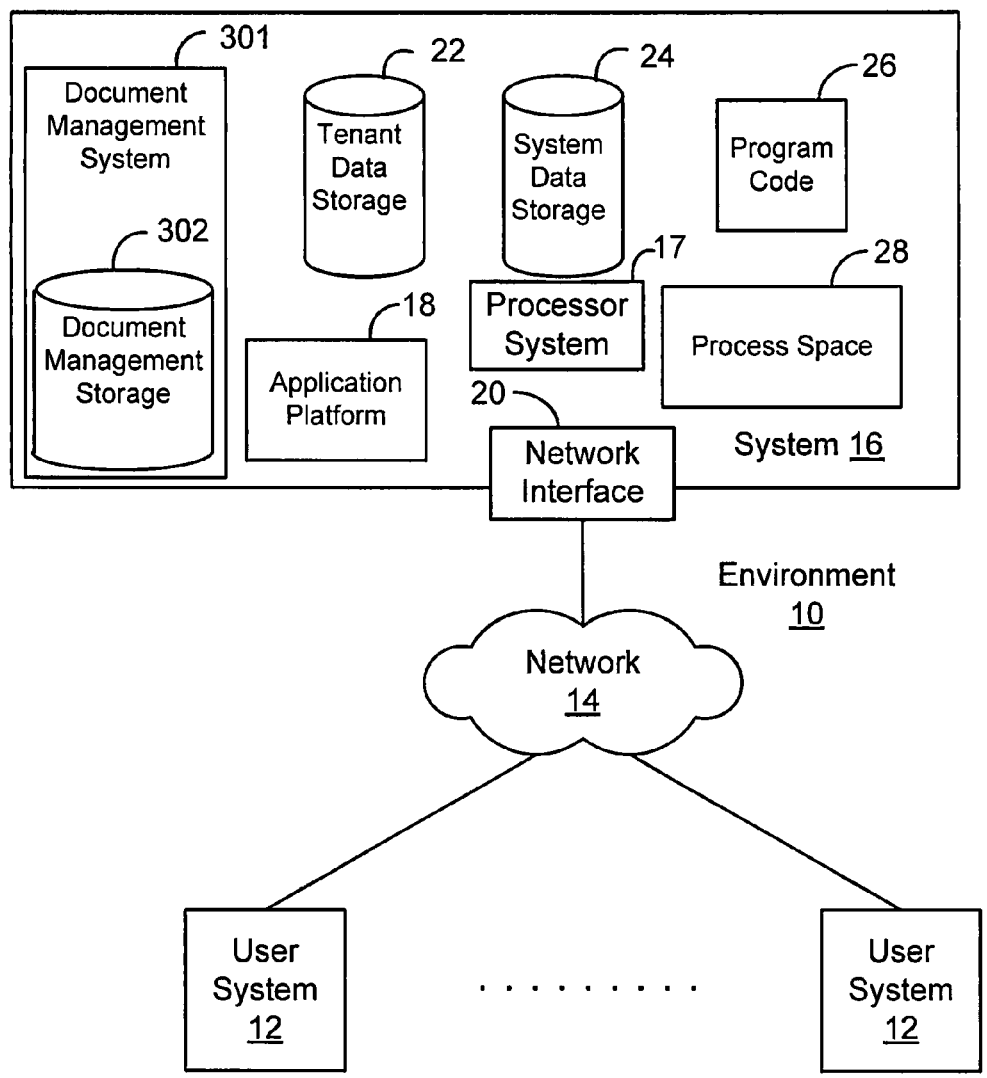
FIG. 1 illustrates a block diagram of an example of an environment in which an on-demand document management system and database service might be used.

Systems and methods are provided for pushing data in an on-demand service. In an embodiment, the user can initiate a subscriber via a single click. As a result of the subscription the user receives updates and/or notifications of updates to the item for which the subscription pertains. The subscription may pertain to a document or an item associated with a document, such as a document type, an author, a tag, a particular keyword, a classification category, or a topic. In an embodiment, some users may be forced to subscribe. For example, every member of a particular organization may be given a subscription to a certain set of tags upon entry to the system. The updates associated with the subscription may be provided via a Really Simple Syndication feed (a RSS feed). The subscription messages may be collected into batches and sent in a batch (e.g., once nightly). In an embodiment, a 'profile' may be associated with a group of users. A profile may be used for defining a group of users that have access to a particular set of shared documents by assigning the same profile to each user that the administrator desires to make a member of the group. A group of users or a profile may have any number of 'forced' subscriptions associated with the group or profile. The forced subscriptions may be for documents having a particular type, such as documents having a particular author or tag. A group may have permission to access a workspace. For example a group may be granted read access to all documents in a particular workspace. As another example, field sales personnel may be in a group called 'Field Sales.' The group 'Field Sales' may be granted a viewer-access role to a workspace called 'Sales Toolkit.' An administrator may set a forced subscription for the group by setting an 'auto-subscribe' option to a tag 'sales-alert' or to a particular author, such as 'Tim Barker.' Then users of the group 'Field Sales' will receive updates to all documents having the tag 'sales-alert' or the author 'Tim Barker,' respectively.

Enforcing the "master copy" paradigm enables embodiments to ensure that document versioning is maintained across many different users accessing the document management storage service using any number of different computers. An identifier (ID) may be associated with the document when the document is uploaded to the document management storage. In an embodiment, the identifier is embedded into the document. Alternatively, the identifier may be associated with the name or the file identifier of a document using a look up table or other technique. Yet further, the identifier may be in-part determined from characteristics of the document, such as the name, date of creation, size or the like. In an embodiment, each ID is unique system wide and/or across all tenants. In an embodiment, the identifier may be updated each time the document is edited, so by comparing identifiers a determination may be made as to whether two copies of the same document have differences in their respective contents. In an embodiment, when a member (e.g., a user) is added to a group that has access to the document management storage, an application is downloaded onto the user system for tracking documents downloaded from the document management storage and/or for updating documents downloaded to the user system. Some and/or all members of a group may be associated with a tenant and/or may not be tenants. A tenant is an entity (e.g., a person, organization, group of people or other entity) that has an account on the multi-tenant system. The group is a group of people or other entities that have access to the document management storage. The members of a group may be a subset of the members of a tenant, may include multiple tenants, or may include multiple subsets of users from different tenants. The documents that are managed and tracked by the document management system may be stored in the document management storage.

In an embodiment, after a user joins a group, documents may be downloaded from the document management storage into the user's system (e.g., into the user's desktop). In an embodiment, each time the user opens one of the documents that was downloaded from the document management storage, the application checks whether the document opened is the most recent version. The application may perform the check by comparing the IDs of the two copies of the document. In an embodiment, if the user's copy of the document is not the most recent version, a message may be sent to the user asking if the user wants to have the user's copy updated. Conventional approaches frequently try to address the sharing of documents using a system of locks, so that when a first user obtains control of the document, all other users are blocked from accessing the document until the first user releases the document (and frees up the lock). Unfortunately, such conventional approaches suffer from the flaw that subsequent users cannot work on the document once the first user has obtained control of it. Thus, these conventional approaches cannot be made to scale to a large number of users that desire to access a document. In contrast, in an embodiment of the current system, locks are not used.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing for the pushing of data in an on-demand service will be described with reference to example embodiments.

System Overview

FIG. 1 illustrates a block diagram of an environment 10 wherein an on-demand document management system and database service might be used. Environment 10 may include user systems 12, network 14, system 16, processor system 17, application platform 18, network interface 20, tenant data storage 22, system data storage 24, program code 26, process space 28, document management system 301, and document management storage 302. In other embodiments, environment 10 may not have all of the components listed and/or may have other elements instead of, or in addition to, those listed above.

Environment 10 is an environment in which an on-demand database service coupled with a document management system exists. User system 12 may be any machine or system that is used by a user to access a database user system. For example, any of user systems 12 can be a handheld computing device, a mobile phone, a laptop computer, a workstation, and/or a network of computing devices. As illustrated in FIG. 1 (and in more detail in FIGS. 2 and 3) user systems 12 might interact via a network 14 with an on-demand database service, which is system 16, coupled with a document management system 301 and document management storage 302.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson.

However, while an administrator is using that user system to interact with system 16, that user system has the capacities allotted to that administrator. In an embodiment, a hierarchical role based model is not used. However, in systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23 (which is shown and will be discussed in conjunction with FIG. 2 below), system data storage 24 for system data 25 (which is shown and will be discussed in conjunction with FIG. 2 below) accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes. System 16 may include document management system 301, which may include document management storage 302 supporting storage and retrieval of documents on behalf of tenants whose data is managed and housed by system 16.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon, which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical disks, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as a single database, a distributed database, a collection of distributed databases, a database with redundant online or offline backups or other redundancies, etc., and might include a distributed database or storage network and associated processing intelligence.

Figure 2:
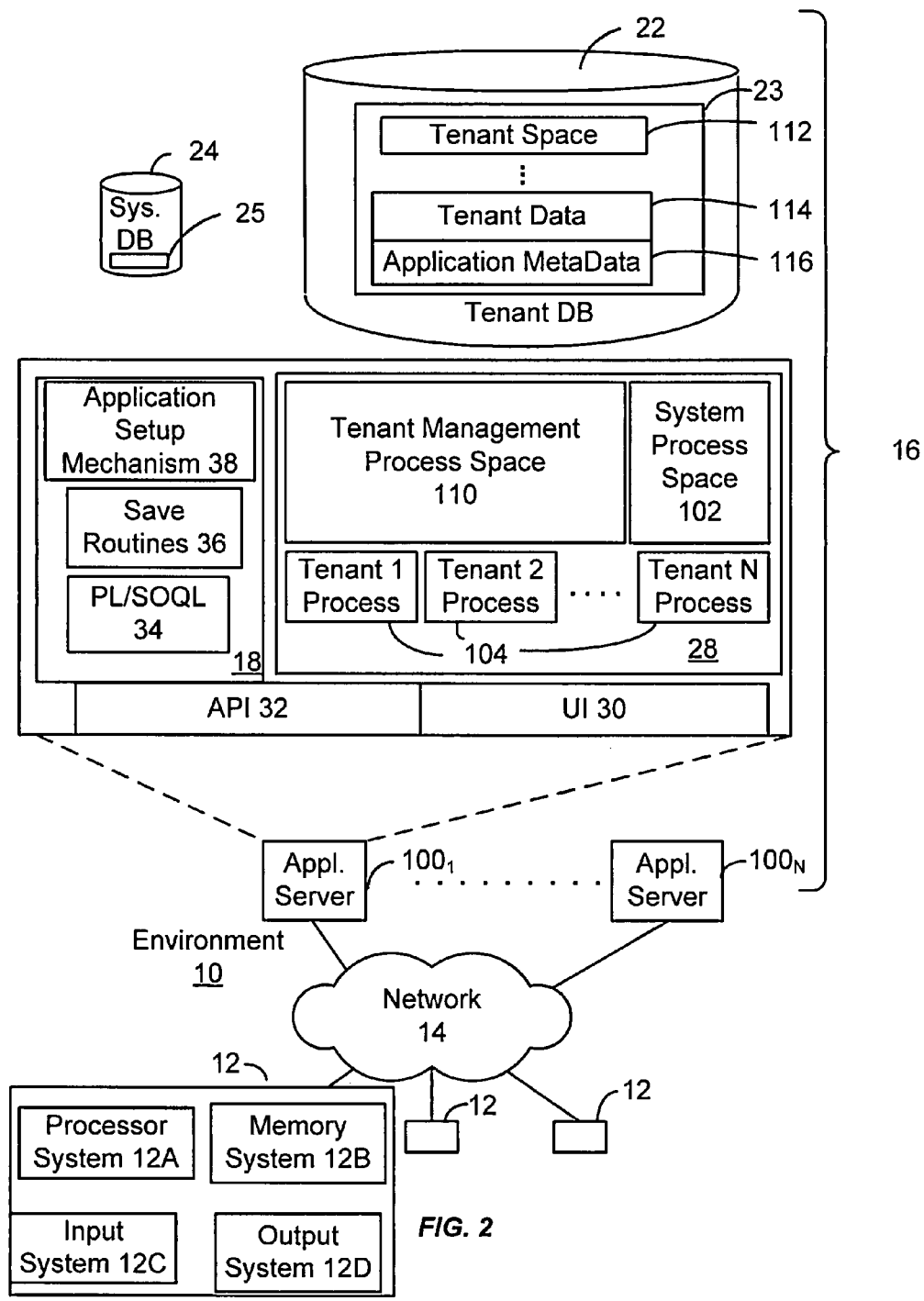
FIG. 2 illustrates a block diagram of an embodiment of elements of FIG. 1 and various possible interconnections between these elements.
Figure 3:
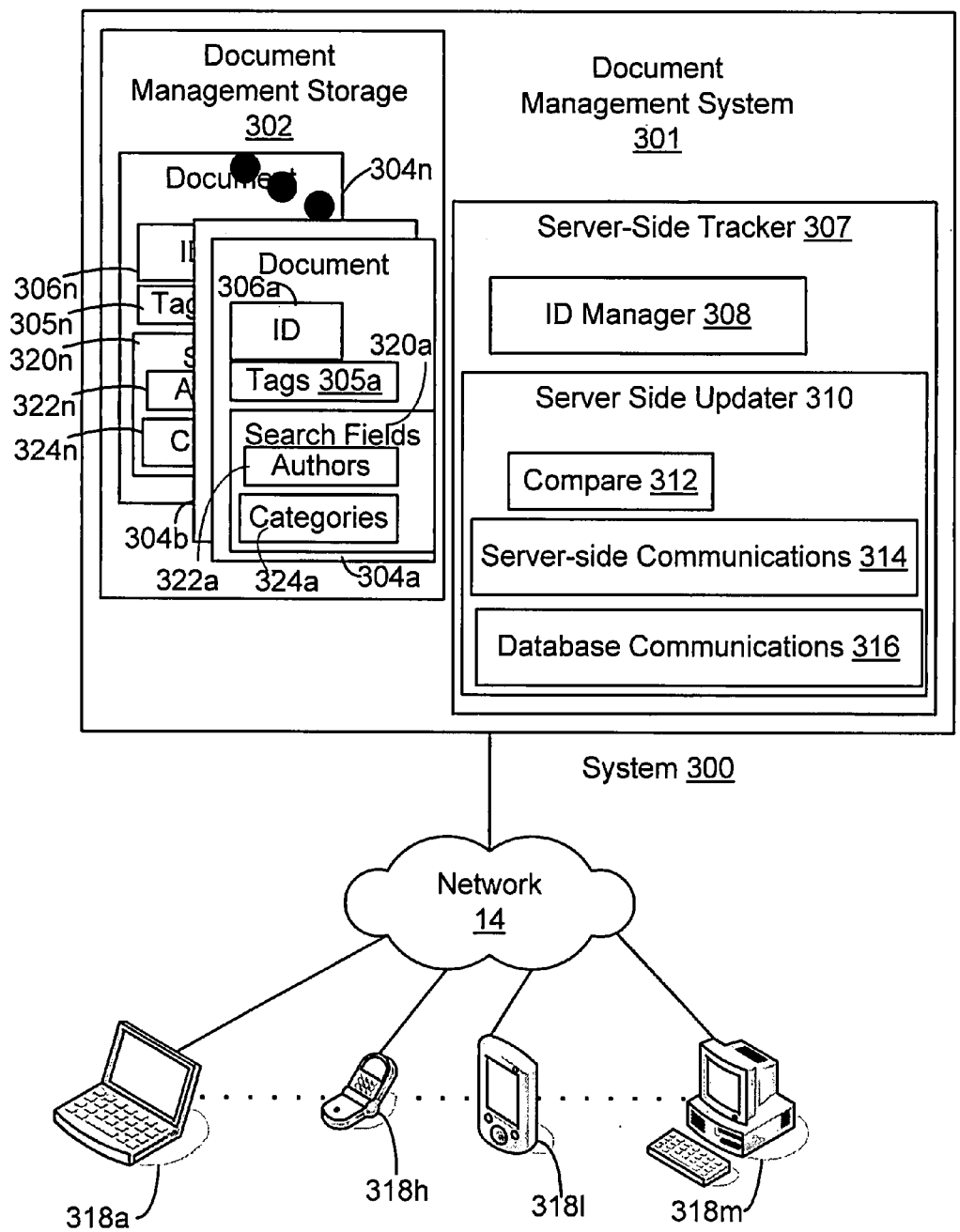
FIG. 3 illustrates a block diagram of an embodiment of a system including a document management system.

FIG. 2 and FIG. 3 also illustrate portions of environment 10. However, in FIGS. 2 and 3 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112 (which may also be referred to as "tenant storage space"), user storage 114 (which may also be referred to as "user data"), and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 23, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers of one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE SYSTEM AND METHOD FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example, by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe the server-side system for tracking documents. Then the client-side system for tracking documents will be described. Next an ID associated with the documents will be described. Then a server-side method of tracking documents will be described. Afterwards a client side method of tracking documents will be described.

Server-Side Tracker

FIG. 3 shows a block diagram of an embodiment of system 300. System 300 may include document management system 301, which may include document management storage 302 having documents 304a-n with tags 305a-n and IDs 306a-n. Document management system 301 may also include server-side tracker 307, which in turn may include ID manager 308 and server-side updater 310. Server-side updater 310 may include compare 312, server-side communications 314, and database communications 316. System 300 may also include network 14 and network devices 318a-m. Documents 304a-n may also include or be associated with search fields 320a-n which may include authors 322a-n and categories 324a-n. In other embodiments, system 300 may not have all of the elements listed and/or may have other elements instead of or in addition to those listed.

Network 14 was discussed in conjunction with FIGS. 1 and 2. System 300 may be an embodiment of environment 10. Although in this specification, document management system 301 is described as performing various actions, it should be understood that this is a short hand for stating that the action associated with or performed by document management system 301 is performed via system 16. Document management system 301 may manage and track documents that are shared by a group of users. Document management storage 302 is a location for storing documents to which multiple people need access. Storing the documents in document management storage 302 may facilitate ensuring that there is only one master version of the latest, published version of a document and that multiple versions of the document with very different content are not created. Also, document management storage 302 may store historical versions of the document, so that the historical versions are available for access if needed. Additionally, storing the documents in document management storage 302 facilitates providing access to those that need access to the document. In an embodiment, document management storage 302 may be tenant data 114 or a location within tenant data 114.

Documents 304*a-n* are the documents stored in document management storage 302. Documents 304*a-n* may be user created documents, such as articles or sales materials.

Tags 305*a-n* are tags that are associated with or added to documents 304*a-n*, respectively. Tags 305*a-n* tag documents 304*a-n*, respectively. Tags 305*a-n* may be keywords or phrases that one interested in finding documents 304*a-n* is likely to associate with documents 304*a-n*. Tags 305*a-n* are added by the user upon uploading and/or publishing documents 304*a-n*, respectively, and may be used as search parameters. The values of tags 305*a-n* may be used as values of keys in a database. Tags 305*a-n* may be used for limiting the number of documents that need to be searched when searching for a particular document. For example, using tags 305*a-n* may reduce the number of documents that need to be searched, because only documents having the tag values of interest need to be searched.

IDs 306*a-n* may uniquely identify each of documents 304*a-n* and/or each version of each of documents 304*a-n*. Optionally, documents 304*a-n* may include multiple versions of one or more of documents 304*a-n* in addition to the most recent version of the documents. IDs 306*a-n* may include a hashed version of the documents 304*a-n*, which may be or may include a checksum of all of the contents of the documents 304*a-n*, respectively. Including a checksum of the documents' contents in IDs 306*a-n* allows a determination of whether the content of a given document has changed. If the checksum of a document (which may be embedded within the ID) has not changed, it is unlikely that the content of that document has changed. In an embodiment, the checksum is computed using Message Digest algorithm 5 (MD5), which computes a hash value that has a 128 bits. IDs 306*a-n* may include a version number, which may be used as a quick check as to whether the content of the document was changed. If the version number has changed, it is likely that content of the document has also changed. IDs 306*a-n* may be included within the metadata of, or otherwise embedded within documents 304*a-n*. In an embodiment, IDs 306*a-n* may be used as pointers to locations in a database where information about the document is stored. Server-Side Tracker 307 may track and update documents 304*a-n*. ID manager 308 creates IDs 306*a-n* and updates IDs 306*a-n* when there is a change to documents 304*a-n*.

Server-side updater 310 communicates with an application on one of network devices 318*a-m*. Server-side updater 310 receives requests to determine whether the user's version of a document is the most up-to-date version. Server-side updater 310 sends updates of documents to the user.

Compare 312 performs the comparison of an ID received from user system 12 to one of IDs 306*a-n* to determine whether the user's copy of the corresponding one of documents 304*a-n* is the most recent. In an embodiment, a checksum may be performed to see if the document has changed. So that the value of the checksum embedded into the document does not affect a subsequent checksum of the document, before a checksum of the document is computed for the first time the identifier 000000000000 is embedded into the document, and the checksum is computed with this identifier present. Then this identifier is updated with the actual checksum of the document. When it is desired to recalculate the checksum to determine whether this document is the same as another, this document is temporarily updated by setting the checksum to all zeros. The checksum is then calculated with the temporary identifier. After the new checksum is computed, the new checksum is inserted into the document as the identifier. If the checksums are the same, then the two documents are assumed to be the same. In other words, to prevent the value of the checksum from affecting the value of a new computation of the checksum, the current value of the checksum is temporarily removed, and the check sum is computed while the document contains all zeros for the checksum. The temporary value for the identifier does not need to be all zeros. The temporary value can be any value as long as the same value is used each time the checksum is computed.

Server-side communications 314 handles communications with user systems 12. Server-side communications 314 may be an interface between server-side tracker 307 and network interface 20 and/or application servers $100_1$-$100_N$ (FIG. 2). Optionally, server-side communications 314 may also send a client-side tracker and installation software for installing the client-side tracker on a user system associated with a new user (e.g., on one of the network devices).

Database communications 316 handles communications with tenant storage 22 (FIG. 2). Database communications 316 may be an interface between server-side tracker and a database server for tenant storage 22.

Network devices 318*a-m* may be embodiments of user systems 12 (FIGS. 1 and 2). The icons used for network devices 318*a-m* are suggestive of many different types of network devices (e.g., network appliances), such as laptops, PCs, mobile phones, and PDAs.

Search fields 320*a-n* are fields that may be included in the document that may be searched separately from the rest of the document (e.g., without searching the rest of the document). Authors 322*a-n* are one example of search fields 320*a-n* that may be included in the document. Authors 322*a-n* are names of people that are listed as the authors of the documents 304*a-n*. Categories 324*a-n* are another example of search fields 320*a-n*. Categories 324*a-n* are categories into which documents 304*a-n* may be classified. Each of documents 304*a-n* may have one or more tags, one or more authors, and one or more categories. Documents 304*a-n* may have other search fields in addition to, or instead, of authors 322*a-n* and categories 324*a-n*.

Client-side Tracker

Figure 4:
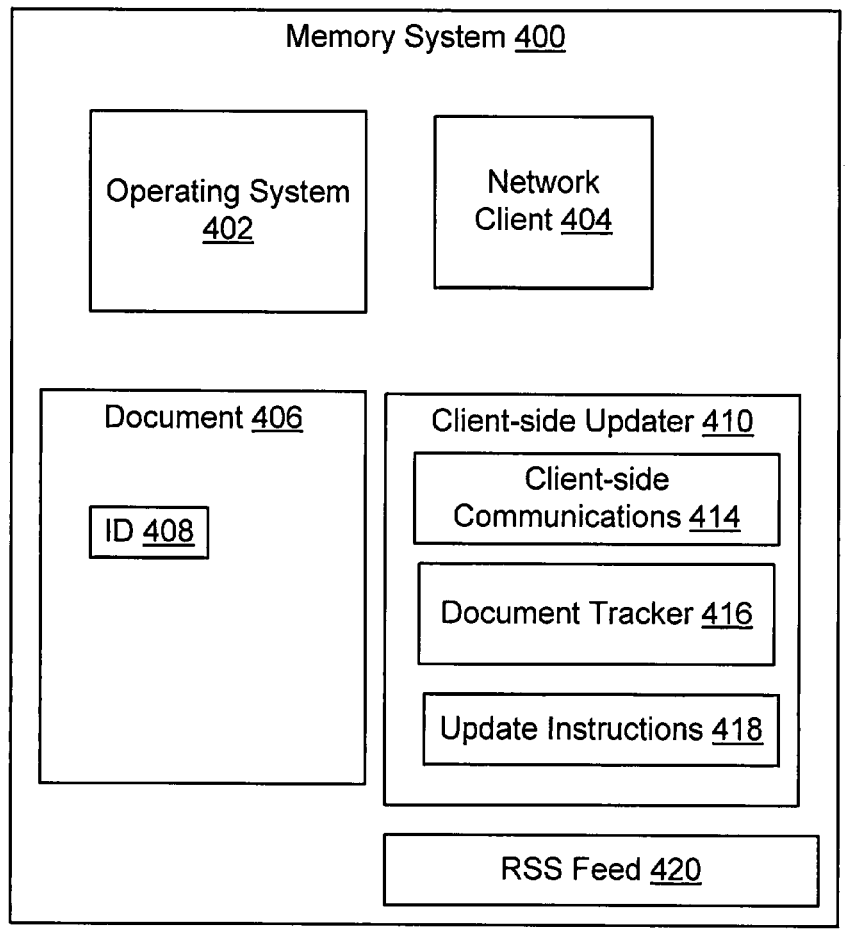
FIG. 4 illustrates a block diagram of the content stored in a memory system of the user system.

FIG. 4 shows a block diagram of the content stored in memory system 400. Memory system 400 may include operating system 402, network client 404, document 406, ID 408, and client-side tracker 410 having client-side communications 414, document tracker 416, update instructions 418, and Really Simple Syndication (RSS) feed 420. In other embodiments, memory 400 may not have all of the elements listed and/or may have other elements instead of or in addition to those listed.

Memory system 400 may be an embodiment of memory system 12B (FIG. 2), which was discussed above. Operating system 402 may include a set of one or more programs that manage the hardware and software resources of the one of network devices 318a-m within which memory system 400 is incorporated, by (for example) allocating and managing tasks and internal system resources as a service to users and programs of the system based on input from the user or from that network device.

Network client 404 is an interface for communicating with other systems via network 14. Network client 404 may use any of a variety of different protocols, such as HTTP, FTP, AFS, or WAP. In an embodiment network client 404 is a browser.

Document 406 may be a copy of a version of one of documents 304a-n (FIG. 3) that was downloaded from document management system 301. ID 408 may be a copy of a version of the one of IDs 306a-n (FIG. 3) that corresponds to the one of documents 304a-n of which document 406 is a copy. ID 408 may have a value that is, or corresponds to, the value that the corresponding one of IDs 306a-n had at the time that the user downloaded or last updated document 406.

Client-side tracker 410 is an application that may update (e.g., synchronize) document 406 to agree with the corresponding one of documents 304a-n (FIG. 3) and may track the opening of document 406. Client-side tracker 410 may be downloaded from document management system 301 (FIG. 3) upon the user joining an organization associated with tenant space 112 and/or upon downloading document 406. Client side tracker 410 may participate in downloading document 406 and may store the locations in memory system 400 where document 406 is stored. Optionally, client-side tracker 410 may track changes in where document 406 is stored. Client-side tracker 410 may monitor the user's system (which is one of network devices 318a-m) for when document 406 is opened, and then client side tracker 410 may send communications to document management system 301 to determine whether document 406 is up-to-date and/or whether the user desires updating document 406.

Client-side communications 414 handles communications with server-side communications 314. Client-side communications 414 sends a request to determine whether document 406 is up-to-date by at least sending ID 408 to document management system 301. Document tracker 416 may be the portion of code of client-side tracker 410 that tracks the location of the document 406 and monitors the user's system to determine whether document 406 was opened. Document tracker 416 may monitor whether documents that were downloaded are open (or are being opened). Document tracker 416 may, at the file-system level, hook into disk level activity to determine when files are opened, by monitoring areas of memory associated with document 406. In another embodiment, a module may be integrated into the authoring application (such as Microsoft Word) that reads files being opened to determine whether the document being opened was downloaded from document management system 301. Update instructions 418 are instructions for updating document 406. Update instructions 418 may cause the overwriting of an old version of document 406 with a new version of document 406.

RSS feed 420 may include one or more machine instructions for a "feed reader" or an "aggregator," which includes a link in the reader (e.g., a browser) that initiates the subscription process. RSS feed 420 may check the user's subscribed feeds regularly for new content. RSS feed 420 may download any updates that are found as a result of RSS feed 420 by checking for new content.

An ID

Figure 5:
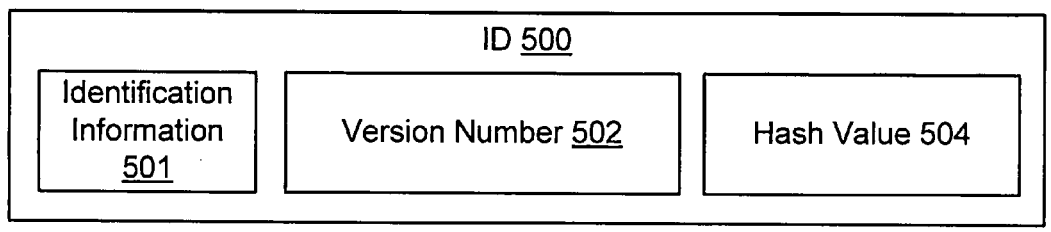
FIG. 5 illustrates a block diagram of an embodiment of an ID.

FIG. 5 shows a block diagram of an embodiment of ID 500. ID 500 may include identification portion 501, version number 502 and hash value 504. In other embodiments, ID 500 may not have all of the elements listed and/or may have other elements instead of or in addition to those listed.

ID 500 is an embodiment of one of IDs 306a-n (FIG. 3). Identification portion 501 identifies the document so that two versions of the same document may be associated within one another as two versions of the same document. In an embodiment, identification portion 501 may be used as a key for locating the document in tenant storage 22. Version number 502 is a value assigned to a current version of one of documents 306a-n. Each time one of documents 306a-n is updated version number 502 is changed. Hash value 504 is the output of a hash function applied to one of documents 306a-n. Hash value 504 may be a checksum of the entire document. Each time one of documents 306a-n is updated its hash value is recalculated. Changes in hash value 504 are indicative of changes in the content of the corresponding one of documents 306a-n.

Client-Side Method of Setting a Subscription

Figure 6:
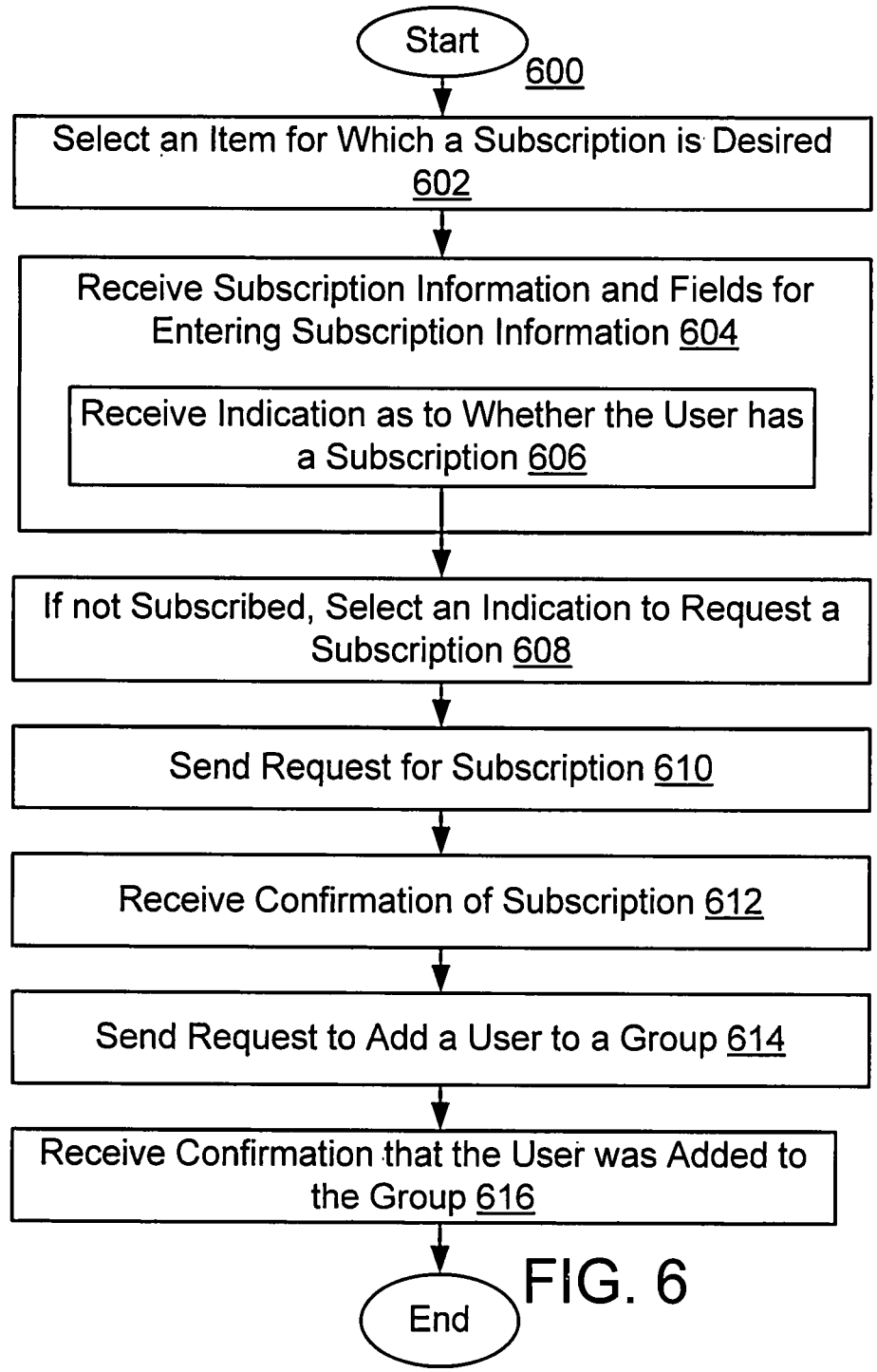
FIG. 6 illustrates a flowchart of an embodiment of a client-side method of establishing a subscription.

FIG. 6 shows a flowchart of an embodiment of a client-side method 600 of establishing (e.g., setting up) a subscription. In step 602, a user or an administrator selects a document or an element associated with a document, which may be a predefined attribute that may be assigned, or added, to a document and for which a subscription option is provided. Some examples of predefined attributes are a tag, a category, an author, or a workspace. Optionally, in the case of an administrator, the administrator may select the item for which a subscription is desired on behalf of an entire group of users. For example, step 602 may include selecting the element associated with the document within settings for a profile associated with a group of users. In step 604, the user or administrator receives information about the document or predefined attribute and fields for entering information. Optionally, in the case of an administrator, the administrator may receive an indication as to whether one or more users, groups of users, roles, and/or profiles have a subscription to the document or attribute of the document. Specifically, in an embodiment, step 606 may be a sub-step of step 604, and step 604 may include the user or administrator receiving information indicating whether the user is currently subscribed to the document, or to an element associated with the document, and may include the user or administrator receiving a field or link that presents to the user or administrator an option to select whether to subscribe to the document or element associated with the document. Optionally, in the case of an administrator, there may be an indication as whether an individual user, group of users, role, or profile includes or has a subscription. In step 608, if the user or administrator is not already subscribed to the document or predefined attribute, the user selects an indication to request a subscription to the document or predefined attribute. In step 610, user system 12 sends the selection to document management system 301. In step 612, user system 12 receives an indication that subscription was selected.

Optionally in step 614, the administrator sends a request to add a user to a profile or group of users having a particular subscription, and to thereby force a subscription upon the user. Optionally in step 616, a confirmation that the subscription was accepted is received by the administrator. In another embodiment, although depicted as distinct steps in FIG. 6, steps 602-616 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method. For example, steps 614 and 616 may form a method that is independent of the method of steps 601-612.

Server-Side Method of Setting a Subscription

Figure 7:
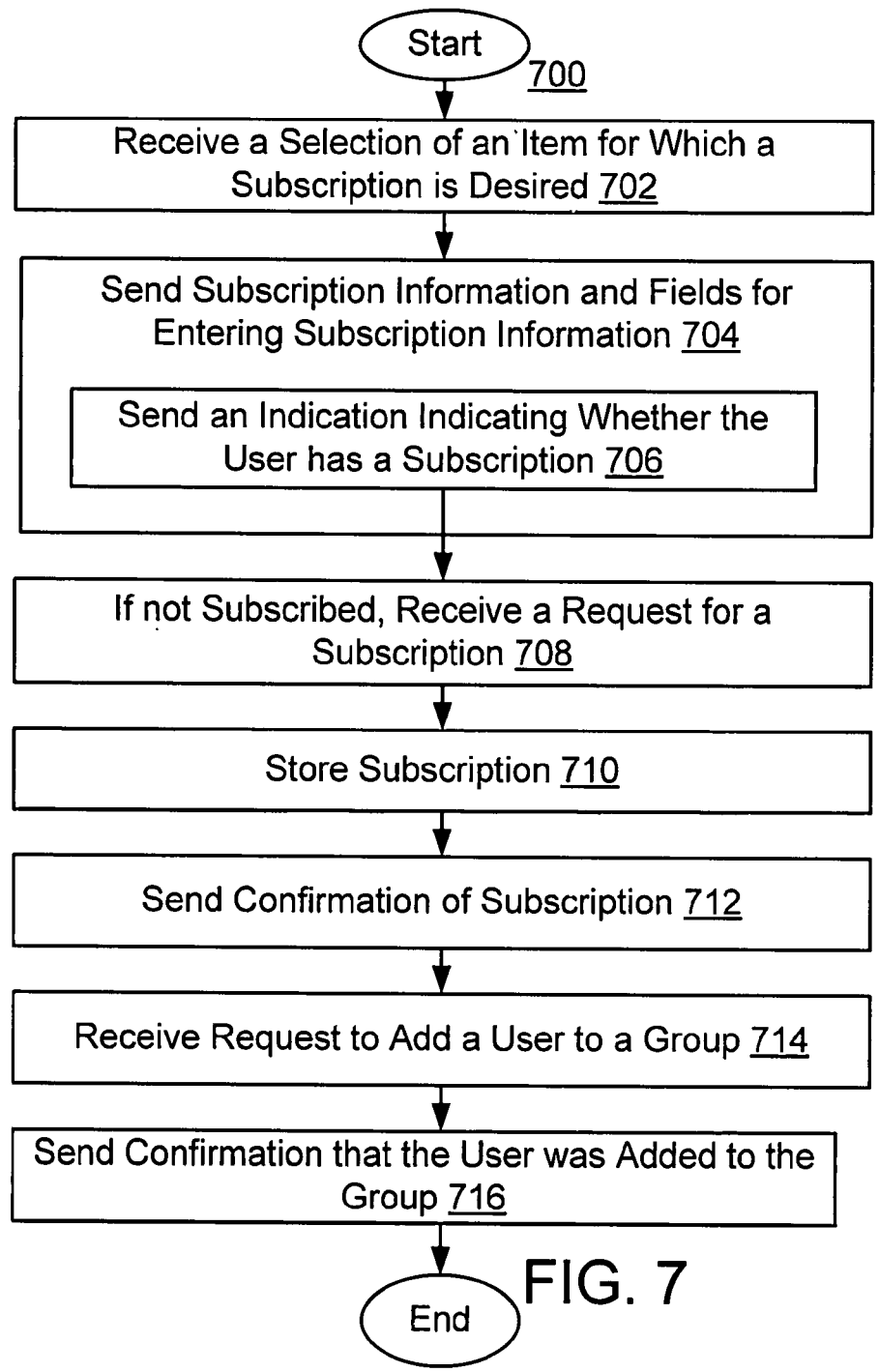
FIG. 7 illustrates a flowchart of an embodiment of a server-side method of establishing a subscription.

FIG. 7 shows a flowchart of an embodiment of a server-side method 700 of setting a subscription. In step 702, a selection is received at document management system 301 (FIGS. 1 and 3) from user system 12 FIGS. (1 and 2) for a document or a predefined attribute that may be assigned or added to a document and for which a subscription options is provided. In step 704, document management system 301 sends to user system 12, for the user or administrator, information about the document or predefined attribute and fields for entering information. Optionally, in the case of an administrator, document management system 301 may send to user system 12, for the administrator, an indication as to whether one or more users, groups of users, roles, and/or profiles have subscription to the document or attribute of the document. Specifically, in an embodiment, in step 706, which may be a sub-step of step 704, document management system 301 sends to user system 12, for the user or administrator, information indicating whether the user is currently subscribed to the document or predetermined attribute and an option to select whether to subscribe to the document. Optionally, in the case of an administrator, there may be an indication as to whether an individual user, group of users, role, or profile includes or has a subscription associated with it, such that user to whom the role or profile are assigned are also assigned the subscription as part of the subscription.

In step 708, document management system 301 receives from user system 12 (e.g., if the user or administrator is not already subscribed to the document or predefined attribute), a selection requesting to subscribe to the document or predefined attribute. In step 710, document management system 301 stores the subscription. In an embodiment, the subscription selection is stored in a database table, so that when an item is updated a database query may determine to which users an update, or an update notification, is sent as a result of having a subscription. In step 712, a confirmation of the subscription is sent to the subscriber. In step 714, document management system 301 receives a request to add a user to a group. Also, in step 714, the user is added to the group. Step 714 may involve storing an identifier for the user in a manner such that the identifier for the user is associated with the group. Step 714 may involve assigning a profile to a user. In step 716, an acknowledgement is sent from document management system 301 to the administrator that the user was added to the group. In another embodiment, although depicted as distinct steps in FIG. 7, steps 702-716 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method. For example, steps 714-716 may form a method that is independent of steps 702-712.

Client-Side Method of Filling a Subscription

Figure 8:
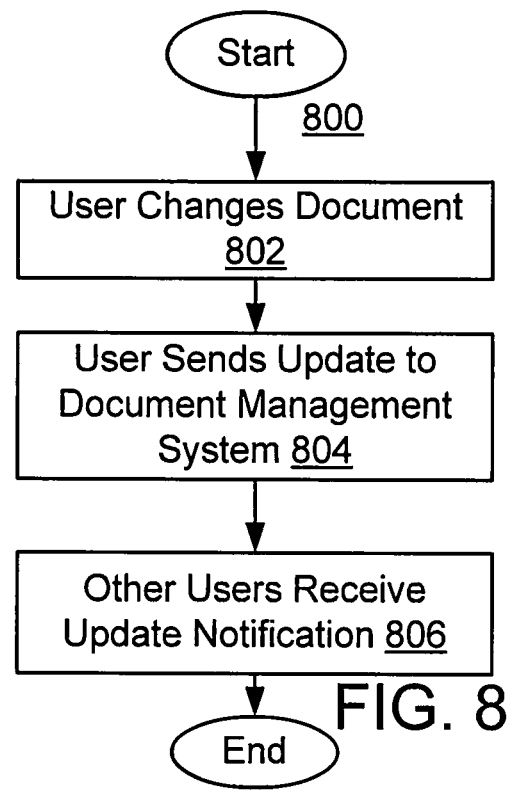
FIG. 8 illustrates a flowchart of an embodiment of a client-side method of filling a subscription.

FIG. 8 shows a flowchart of an embodiment of a client-side method 800 of filling a subscription. In step 802, a user changes (e.g., updates) a document at one of user systems 12. In step 804, the user sends an update of the document to document management system 301. In step 806, other user systems 12 that have subscriptions receive notifications of the update and/or a copy of the updated document. The updated document, and/or notification of the update, is sent to the user based on the document having a tag to which the user is subscribed, based on being located in a workspace to which the user is subscribed, based on the document being located in a category to which the user is subscribed, based on the document having an author to which the user is subscribed, or the document having another attribute associated with the document. Different user systems 12 may receive their respective notifications and/or updates depending on the notification setting chosen. In another embodiment, although depicted as distinct steps in FIG. 8, steps 802-806 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Server-Side Method of Filling a Subscription

Figure 9:
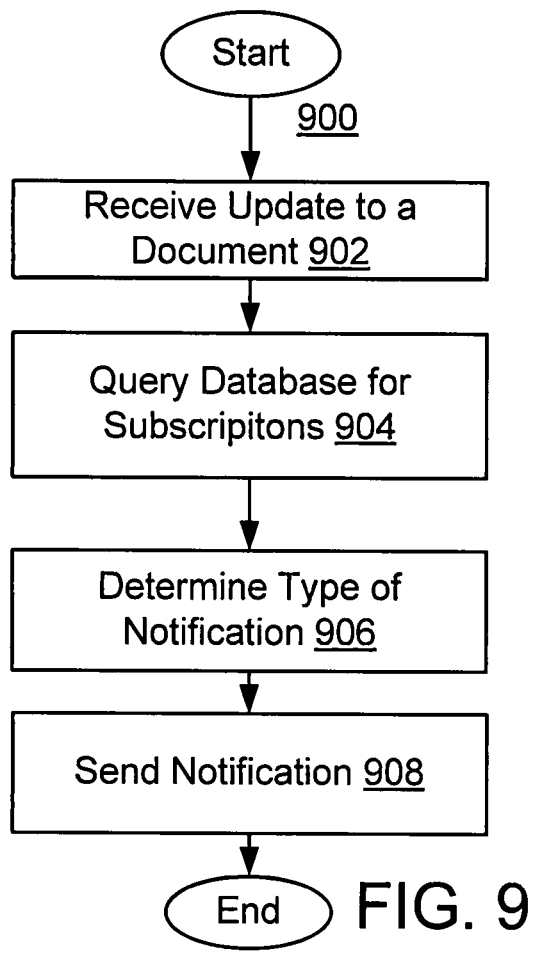
FIG. 9 illustrates a flowchart of an embodiment of a server-side method of filling a subscription.

FIG. 9 shows a flowchart of an embodiment of a server-side method 900 of filling a subscription. In step 902, an update of a document is received at document management system 301 (FIG. 3) from one of user systems 12 (FIGS. 1 and 2). In step 904, in response to receiving the update, document management system 301 determined which subscriptions are affected. For example, in step 904, document management system 301 may query a database or database table for subscriptions related to the update. In step 906, a determination is made of the types of notifications associated with the subscriptions. In step 908, notifications are sent from document management system 301 to user systems 12 based on the types of notifications selected. For example, some subscriptions may be sent immediately after the update occurs while other subscriptions may be sent in a batch once a day, such as late at night or early morning or another period in which the number of users using document management system 301 is expected to be low. In another embodiment, although depicted as distinct steps in FIG. 9, steps 902-908 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Screenshots

Figure 10:
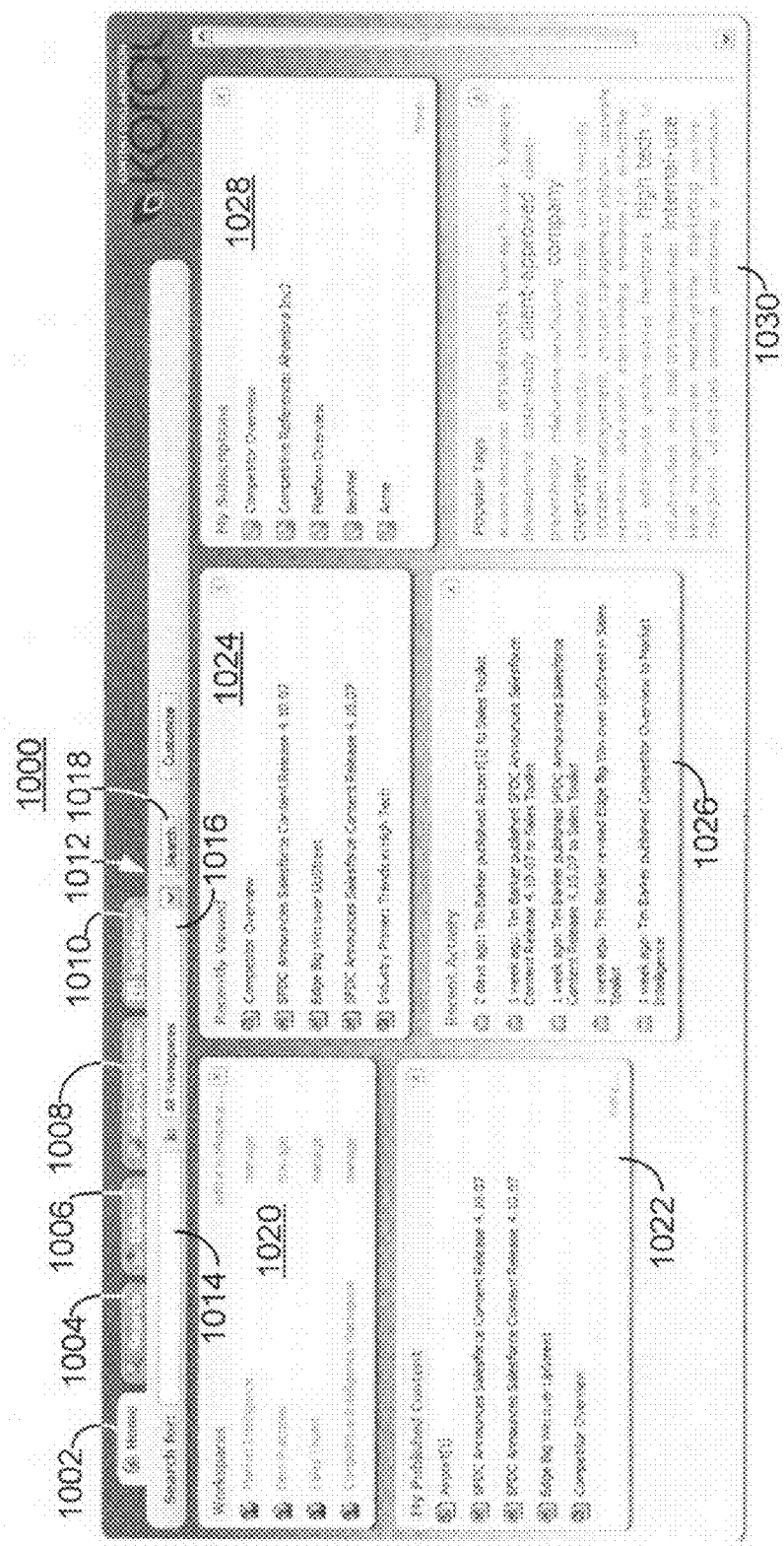
FIG. 10 illustrates a screenshot of an example of a homepage of a website for sharing documents.

FIG. 10 shows a homepage 1000 of a website for viewing and updating shared documents. Homepage 1000 may include home tab 1002, search tab 1004, upload tab 1006, subscriptions tab 1008, settings tab 1010, and search bar 1012 having search term field 1014, filter 1016, and search button 1018. Homepage 1000 may also include workspaces box 1020, my published content box 1022, recently viewed box 1024, recent activity box 1026, my subscriptions box 1028, and popular tags box 1030. In other embodiments, homepage 1000 may not have all of the elements listed and/or may have other elements instead of or in addition to those listed.

Homepage 1000 displays a variety of types of information that a user may want to monitor and/or interact with. Homepage 1000 may include links to other pages. In an embodiment, homepage 1000 may include a variety of documents that are located in different boxes. Selecting one of the documents in one of the boxes causes a webpage to be presented that shows information about the document. In an embodiment, when the user's cursor hovers over an icon for one of the documents some of the information listed in the document webpage may be displayed, such as the author and the number of votes received for and/or against the document.

Home tab 1002 is a tab that brings a user to homepage 1000 if the user is not already viewing homepage 1000 and/or refresh homepage 1000. In other words, although if the user selects home tab 1002 while viewing homepage 1000, the page being viewed may not necessarily change, but may be refreshed. In general, in this specification, in an embodiment, selecting a tab for a webpage that is already being viewed may cause the webpage to be refreshed. Home tab 1002 may also be available from other webpages, and if home tab 1002 is selected while on another webpage, the user is brought to homepage 1000. Search tab 1004, when selected, brings the user to a webpage that allows the user to select other options that related to performing a search (the webpage associated with search tab 1004 is discussed in U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007. Upload tab 1006, when selected, brings the user to a webpage that includes links and/or instructions for uploading a file to document management storage 302. An example of a webpage that may be associated with upload tab 1006 is also discussed in U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007. Subscription tab 1008 brings the user to a webpage that allows the user to initiate and/or modify a subscription to documents updated and/or published within document management storage 302 (FIGS. 1 and 3). Settings tab 1010 brings a user to a webpage that allows a user to set and/or modify settings related to documents, the user's account, and/or other accounts (the webpage associated with settings tab 1010 is discussed in conjunction with FIGS. 15-24).

Search bar 1012 includes one or more links and/or fields that allow a user to formulate a search query. As a result of interacting with search bar 1012, a search may be conducted for documents meeting the search query and that are stored within document management storage 302 (FIGS. 1 and 3). For example, search term field 1014 allows a user to enter a combination of keywords, which may be used as part of a search query, and filter 1016 may allow the user to select from a menu of filters that have already been associated with (e.g., established within) document management system 301 (FIGS. 1 and 3). Some examples of filters that may be included within filter 1016 are categories, tags, workspaces, and/or authors. Search button 1018, when selected, initiates a search based on a search query formulated from the current entries in search term field 1014 and filter 1016. In an embodiment, after the search has been initiated, document management system 301 switches the webpage presented to the user so that the user is presented with the search page, and document management system 301 presents results of the search to the user on the search page. After the search webpage is presented to the user, the user is allowed to refine the search. As mentioned earlier, the search page is discussed in U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007.

Workspaces box 1020 lists workspaces that currently exist. Selecting one of the workspaces causes a list of documents stored in that workspace to be presented to the user. In an embodiment, upon presenting a list of the documents in the workspace selected, the webpage presented to the user is changed to the search page.

My published content box 1022 lists the documents that the user published. Recently viewed box 1024 lists documents that user has viewed recently. Recent activity box 1026 lists documents containing recent activity of the user. The information displayed may include whether the document was published, how long ago the document was created or added to document management storage 302, and/or the date that the document was released to the public, if the document was released, for example. My subscriptions box 1028 lists documents to which the user has a subscription. Popular tags box 1030 lists the more popular tags that were added and/or associated with various documents. In an embodiment, the tags that are more popular (e.g., the tags that appear in more documents) are presented in a larger font. In an embodiment, the more popular the tab the larger the font.

Figure 11:
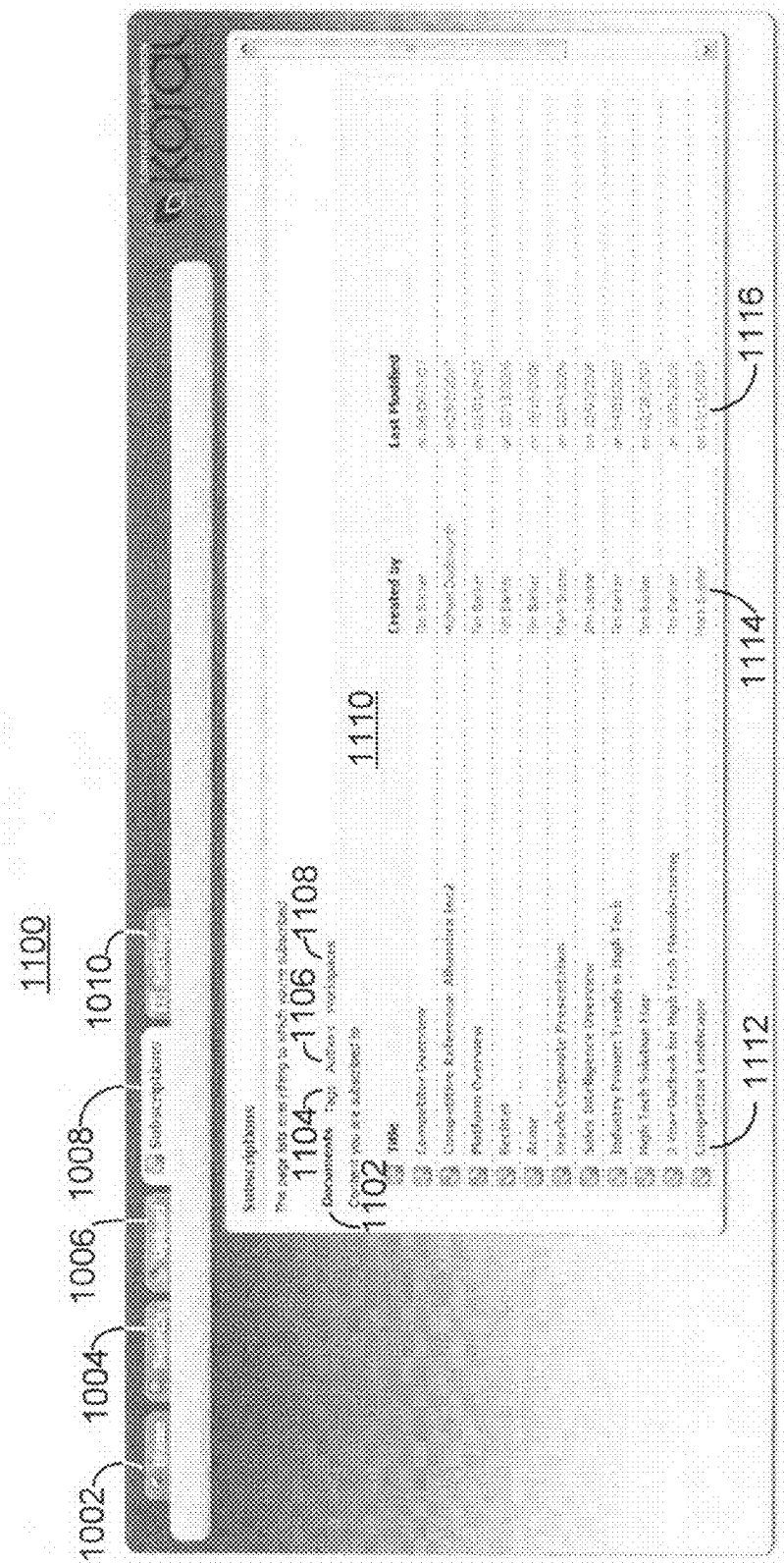
FIGS. 11-14 illustrate screenshots of examples of subscriptions pages.

FIG. 11 shows a screenshot of an example of subscriptions page 1100. Subscriptions page 1100 may include home tab 1002, search tab 1004, upload tab 1006, subscriptions tab 1008, and settings tab 1010. Subscriptions page 1100 may also include documents tab 1102, tags tab 1104, authors tab 1106, workspaces tab 1108, and document subscriptions 1110. Document subscriptions 1110 may include title column 1112, created-by column 1114, and last-modified column 1116. In other embodiments, subscriptions page 1100 may not have all of the elements listed and/or may have other elements instead of or in addition to those listed.

Home tab 1002, search tab 1004, upload tab 1006, subscriptions tab 1008, and settings tab 1010 were described in conjunction with FIG. 10, above. Subscriptions page 1100 displays information about subscriptions to which the user is currently subscribed. Subscription page 1100 is the webpage that is displayed to the user in response to selecting subscriptions tab 1008.

Documents tab 1102 brings the user to a webpage that displays a list of documents to which the user is subscribed. Upon selecting documents tab 1102, the document management system 301 sends a webpage to user system 12 that displays information about the documents to which the user is subscribed. Similarly, tags tab 1104 brings the user to a webpage that displays a list of tags to which the user is subscribed, and upon selecting tags tab 1104, the document management system 301 sends a webpage to user system 12 that displays information about the tags to which the user is subscribed. Likewise, authors tab 1106 brings the user to a webpage that displays a list of authors to which the user is subscribed, and upon selecting authors tab 1106, the document management system 301 sends a webpage to user system 12 that displays information about the authors to which the user is subscribed. Also, workspaces tab 1108 brings the user to a webpage that displays a list of documents to which the user is subscribed, and upon selecting workspaces tab 1108, the document management system 301 sends a webpage to user system 12 that displays information about the workspaces to which the user is subscribed.

Document subscriptions 1110 is a collection of information about documents to which the user is subscribed. Selecting documents tab 1102 may cause document subscriptions 1110 to be displayed, if document subscriptions 1110 is not already being displayed. In an embodiment, as a default, when subscription page 1100 is opened, document subscriptions 1110 are displayed. Title column 1112 includes a list of titles of documents to which the user is subscribed. Created-by column 1114 includes the authors that created the corresponding document in the same row, whose title is listed in title column 1112. Last-modified column 1116 includes the date (and optionally may include the time) that the corresponding document listed in title column 1112 in the same row was last modified.

Figure 12:
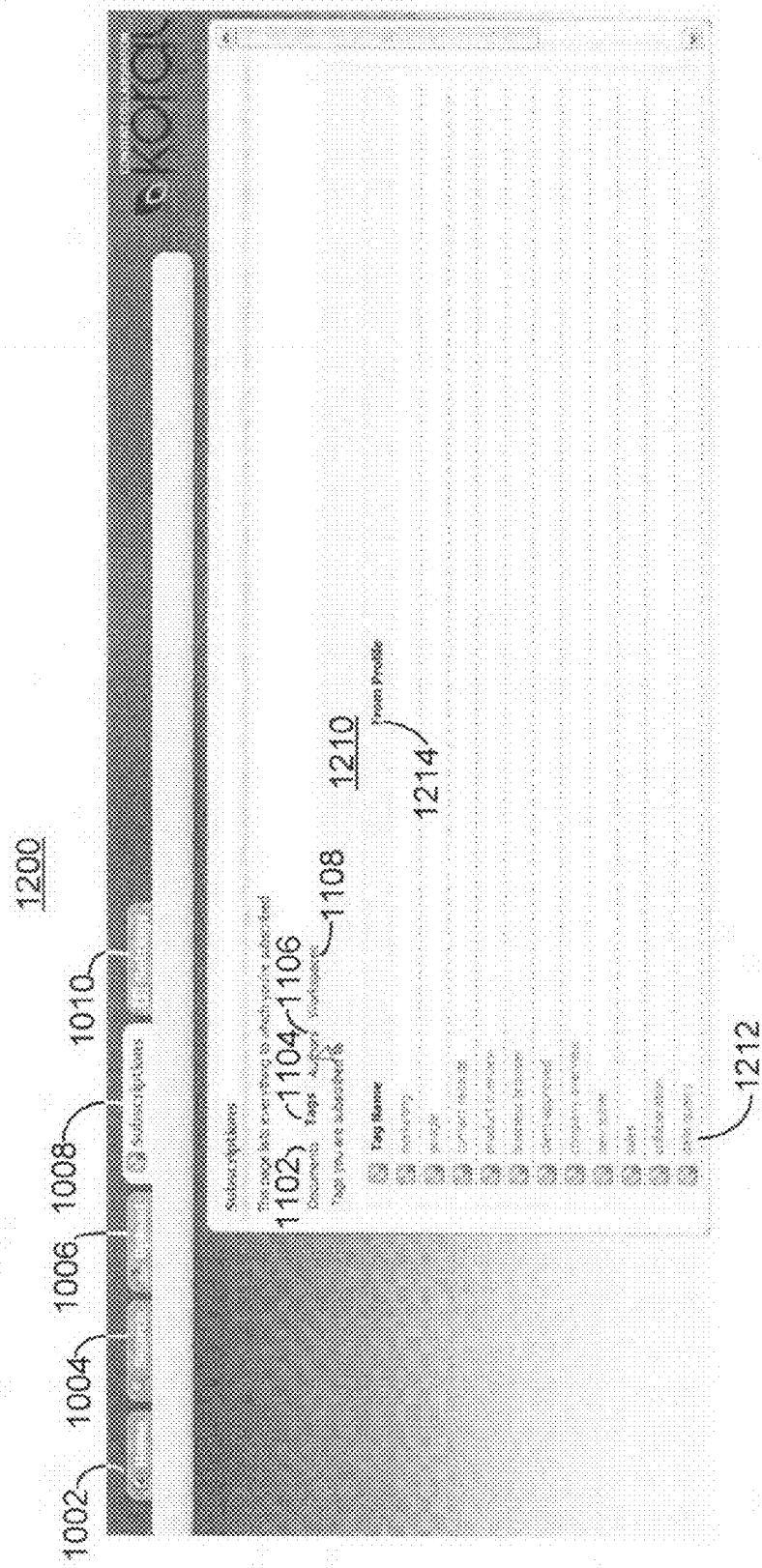
Figure 13:
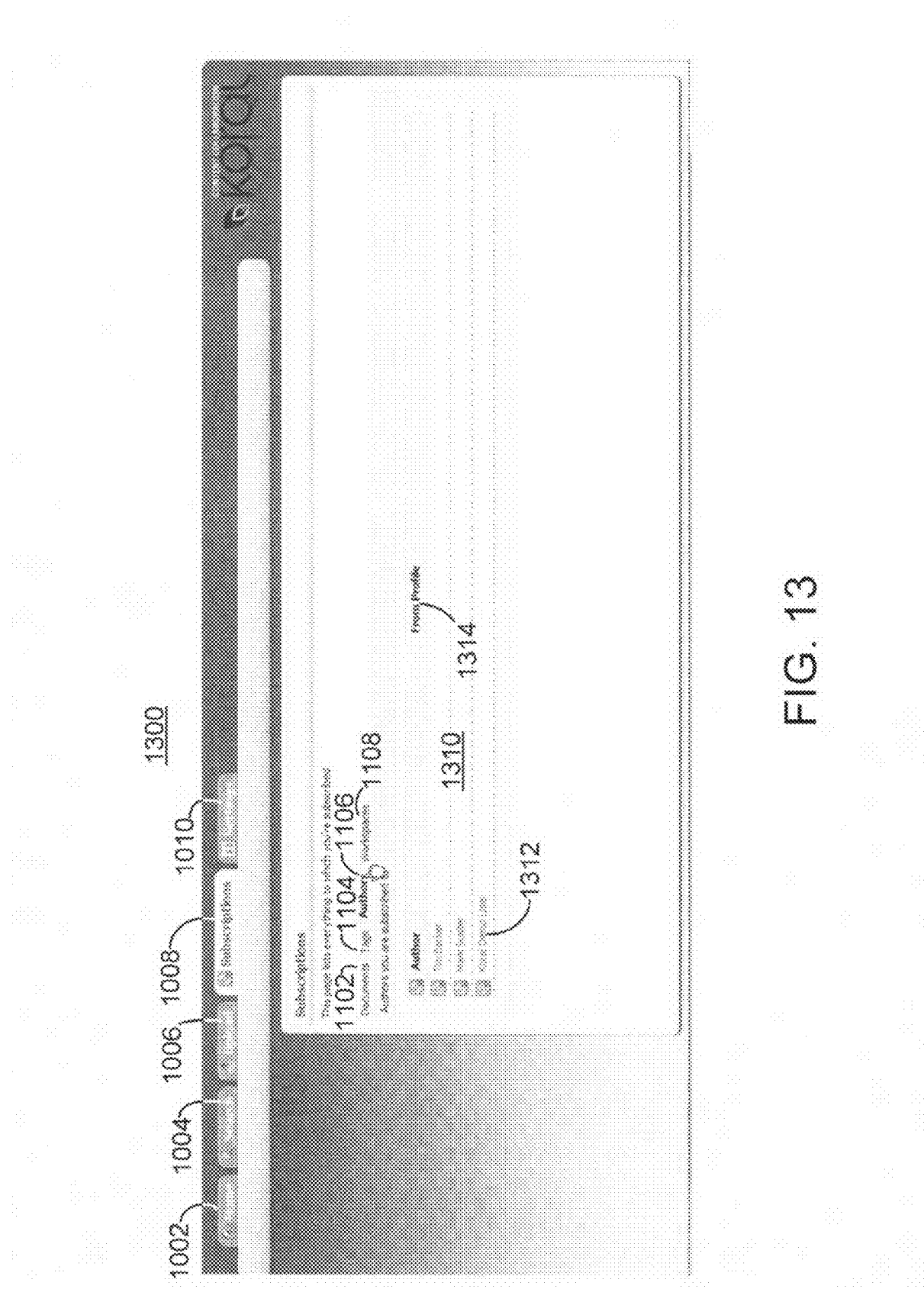
Figure 14:
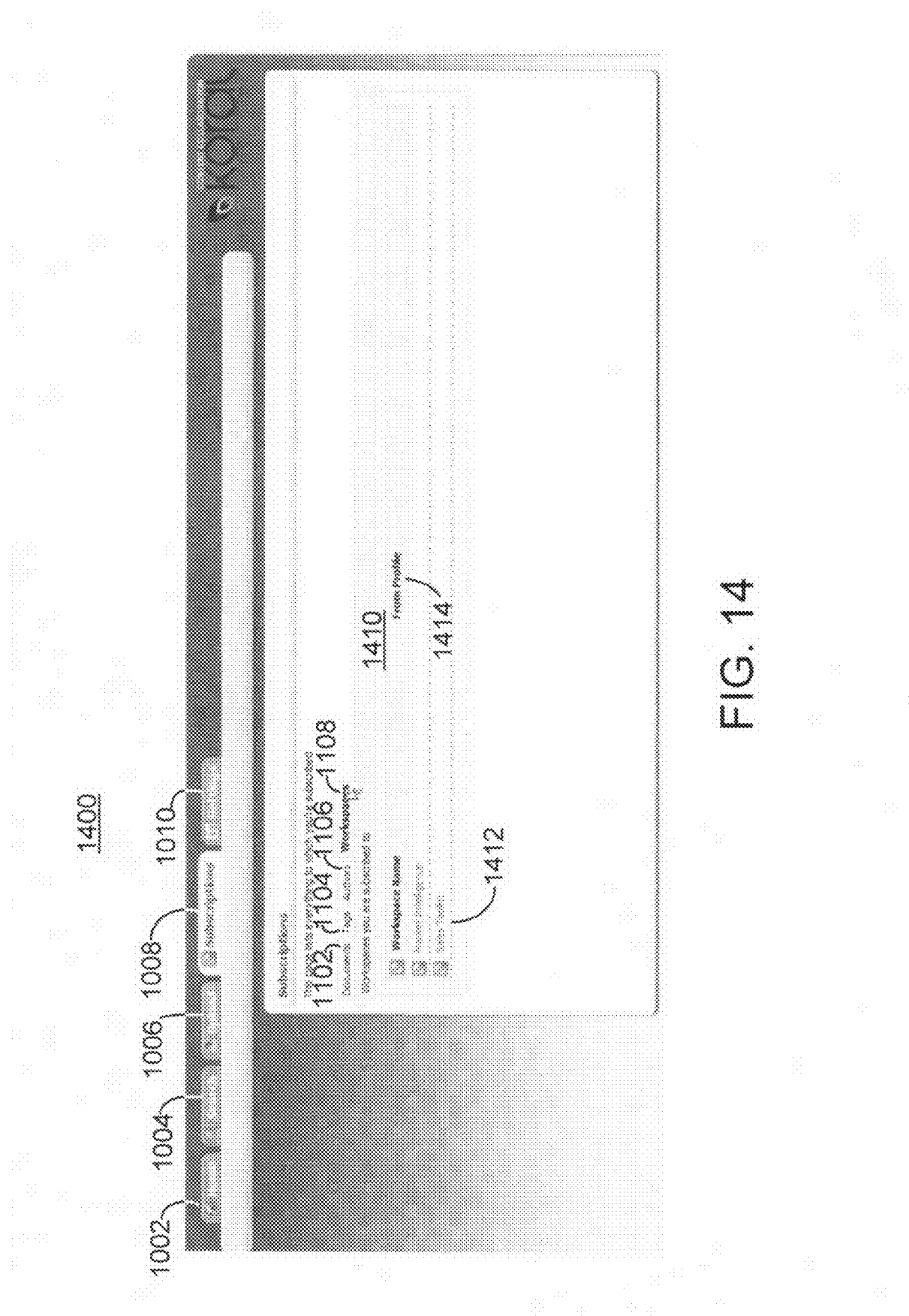

FIGS. 12, 13, and 14 show screenshots of examples of subscriptions pages 1200, 1300, and 1400 respectively, which are related to subscriptions page 1100. Subscriptions pages 1200, 1300 and 1400 may each include home tab 1002, search tab 1004, upload tab 1006, subscriptions tab 1008, and settings tab 1010, documents tab 1102, tags tab 1104, authors tab 1106, and workspaces tab 1108.

Home tab 1002, search tab 1004, upload tab 1006, subscriptions tab 1008, and settings tab 1010 were described in conjunction with FIG. 10, above, and documents tab 1102, tags tab 1104, authors tab 1106, and workspaces tab 1108 were described in conjunction with FIG. 11, above.

FIG. 12 shows a screenshot of an example of tag subscriptions 1210, which includes tag names 1212 and from-profiles 1214 (in addition to the elements discussed above that are common to FIGS. 11-14). In other embodiments, subscriptions page 1200 may not have all of the elements listed and/or may have other elements instead of or in addition to those listed.

Subscriptions page 1200 also displays information about subscriptions to which the user is currently subscribed. However, the information displayed on subscriptions page 1200 relates to the tags to which the user is subscribed. Subscription page 1200 is the webpage that is displayed to the user in response to selecting tags tab 1104. Tag subscriptions 1210 includes the information about the tags to which the user is subscribed that is displayed upon selecting tags tab 1204. Tags names 1212 is a list of the names of the tags to which the user is subscribed. From-profiles 1214 lists the name of the corresponding profile (if any) that is associated with the user and that generated the subscription to the tag in the same row. Thus, if a user is assigned a profile A, and profile A includes a subscription to tab B, then B will be listed in tag names 1212 on the same line as which A is listed in by-profile 1214.

FIG. 13 shows a screenshot of an example of author subscriptions 1310, which includes author names 1312 and from-profiles 1314 (in addition to the elements common to FIGS. 11-14). In other embodiments, subscriptions page 1300 may not have all of the elements listed and/or may have other elements instead of or in addition to those listed.

From-profiles 1314 is similar to from-profiles 1214, which was described in conjunction with FIG. 12. Subscriptions page 1300 also displays information about subscriptions to which the user is currently subscribed. However, the information displayed on subscriptions page 1300 relates to the authors to which the user is subscribed. Subscription page 1300 is the webpage that is displayed to the user in response to selecting authors tab 1106. Author subscriptions 1310 includes the information about the authors to which the user is subscribed that is displayed upon selecting authors tab 1106. Author names 1312 is a list of the names of the authors to which the user is subscribed. From-profiles 1314 lists the name of the corresponding profile (if any) that is associated with the user and that generated the subscription to the author in the same row.

FIG. 14 shows a screenshot of an example of workspaces subscriptions 1410, which includes workspace names 1412 and from-profiles 1414 (in addition to the elements discussed above that are common to FIGS. 11-14). In other embodiments, subscriptions page 1400 may not have all of the elements listed and/or may have other elements instead of or in addition to those listed.

Subscriptions page 1400 also displays information about subscriptions to which the user is currently subscribed. However, the information displayed on subscriptions page 1400 relates to the workspaces to which the user is subscribed. Subscription page 1400 is the webpage that is displayed to the user in response to selecting workspaces tab 1108. Workspaces subscriptions 1410 includes the information about the workspaces to which the user is subscribed that is displayed upon selecting authors tab 1106. Workspace names 1412 is a list of the names of the workspaces to which the user is subscribed. From-profiles 1414 lists the name of the corresponding profile (if any) that is associated with the user and that generated the subscription to the workspace in the same row. From-profiles 1414 is similar to from-profiles 1214, which was described in conjunction with FIG. 12.

Figure 15:
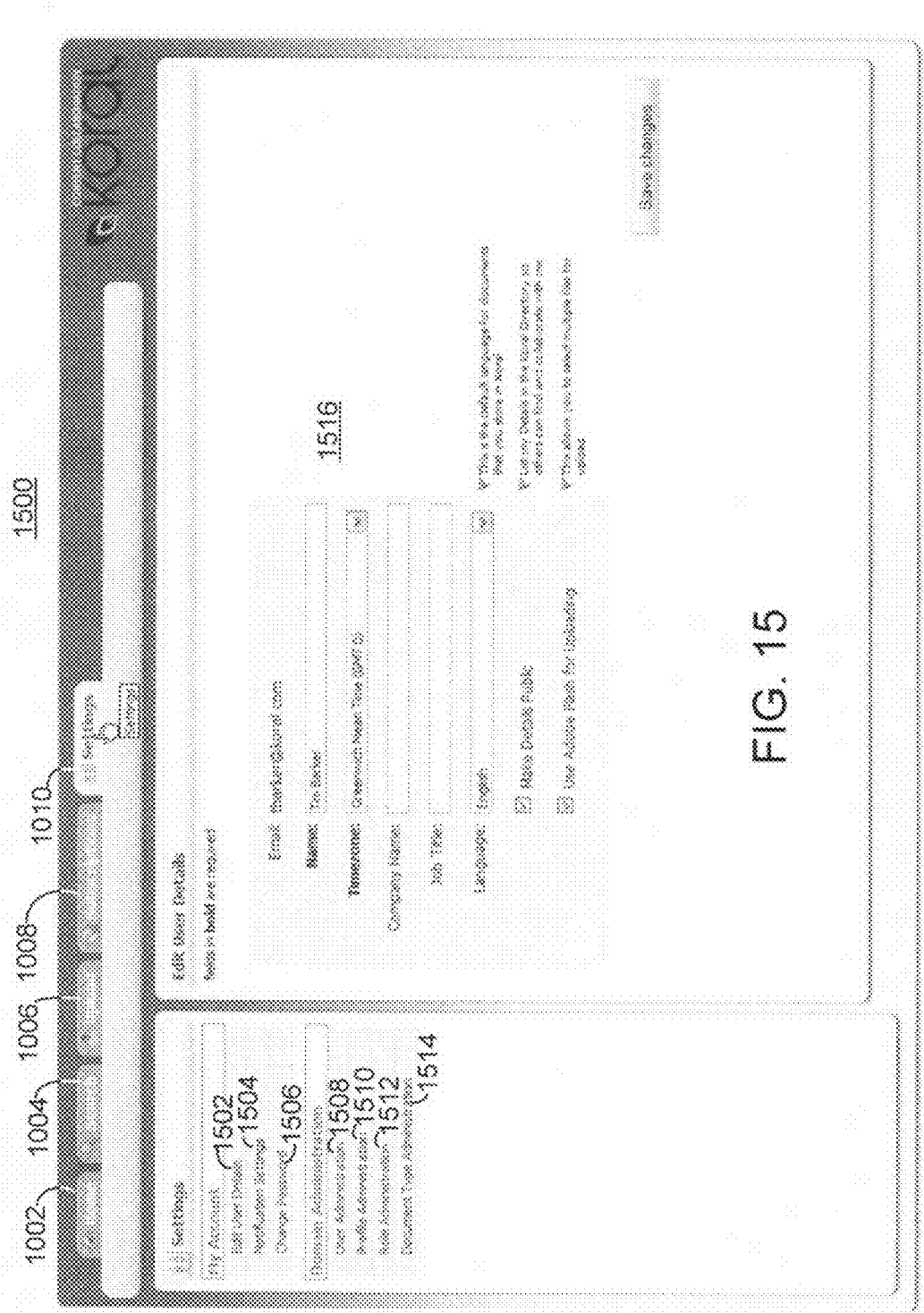
FIGS. 15-24 illustrate a screenshot of examples of settings pages of a website for sharing documents.

FIG. 15 shows an example of settings page 1500. Settings page 1500 may include home tab 1002, search tab 1004, upload tab 1006, subscriptions tab 1008, and settings tab 1010. Settings page may include user detail 1502, notification settings 1504, change password 1506, user administration 1508, role administrations 1510, profile administration 1512, document type administration 1514, and user details 1516. In other embodiments, settings page 1500 may not have all of the elements listed and/or may have other elements instead of or in addition to those listed.

Home tab 1002, search tab 1004, upload tab 1006, subscriptions tab 1008, and settings tab 1010 were explained above in conjunction with FIG. 10. User details 1502 may allow the users to enter information about themselves, such as their names, e-mail address, company name, job title, time zone, and the language that the user uses on the website. User details 1502 may include information about the user that is used for setting up an account and/or managing the user's account.

Notification settings 1504 include settings that relate to the form in which the user will be automatically notified of changes to documents and the frequency with which the user will be notified of changes to the document. In an embodiment, the notifications that are associated with notifications settings 1504 may occur regardless of whether the user downloaded or opened a version of the document to user system 12 (FIGS. 1 and 2). Notification settings 1504 may include a choice of whether to send the notification via e-mail, and/or a Really Simple Syndication (RSS) feed. Notification settings 1504 may allow a user to choose whether to receive notification nightly as part of a batch of updates that occurred the previous day or as the changes occur in the document. Notification settings 1504 may allow a user to indicate whether to automatically subscribe the user to any document that the user comments upon. Change password 1506 may allow a user to change their password.

User administration 1508 includes options that allow an administrator to add users and/or remove users. For example, user administration 1508 may include a link that causes the sending of an invitation for a potential user to become a new user of document management system 301. User administration 1508 may include a link that disables a user, enables a user, and/or resets a password of a user. User administration 1508 may allow an administrator to view a list of users, their e-mail addresses, and/or other information about the users. User administration 1508 may include a field for entering a search string for searching for a user.

Role administrations 1510 allows the administrator to setup and/or edit the roles that are available to be assigned to a user. Role administrator 1510 may allow an administrator to change, add and/or remove the privileges that are associated with each role. Role administrator 1510 may be capable of adding new roles. Some examples of some roles may be viewer, commentator, administrator, and/or application exchange user. A given user may be assigned multiple roles. For example, if a user is assigned only the roles of commentator and viewer, then the user may be allowed to add comments about documents and view documents, but may not have the privileges associated with an administrator or application exchange user.

Profile administrator 1512 may allow the creation of profiles, removal of profiles, and/or the assignment and/or change of privileges associated with a given profile. A profile assigned to a user may determine the workspaces that the user can access and a combination of one or more roles in which the user can access those workspaces. For example, one profile may allow access to workspace A only as a viewer and to workspace B as a commentator. A profile may have a set of actions that are allowed. As another example one profile may allow the creation of roles, while another profile may allow the viewing of roles, but not the creation of roles. Each profile may have a set of webpages that are viewable by a user having that profile. For example, one profile may not allow a user to view the settings tab, or may render a settings webpage with fewer options than are available for modification by another profile.

Document type administration 1514 allows the user to edit, add and/or remove the document types that are available for assigning to any given document. A document type is a description of a type of document. A document that is assigned a document type has one or more characteristics that are described by the document type. Some examples of document types may be competitive information, competitive alert, business operations, industry briefing, marketing campaign, research publication, and sales aid. Each document in a given document type may have properties associated with that document type. A property is a description of one or more characteristics that are associated with a document type. Examples of the properties associated with a type may be competitor, approved for client use, and industry. When a user uploads a new document, and adds the new document to document management storage 302 (FIGS. 1 and 3), the user may be requested to assign one or more document types to the document. Each property may have a list of possible values and the administrator may be able to select whether that list is available to choose in a pick list, is a required property of the type, and/or whether the property is available to use as a filter while searching. For example, the document type business operations may have a property business operations, which in turn may be capable of assuming the values of attrition, procurement, credit collections, general, and/or order management. User detail settings 1516 are used for entering details about a user. The user may use user detail settings 1516 for editing information about the user's self.

FIGS. 16-24 show screenshots of examples of settings pages 1600-2400, respectively. Settings pages 1600-2400 may each include home tab 1002, search tab 1004, upload tab 1006, subscriptions tab 1008, settings tab 1010, user detail 1502, notification settings 1504, change password 1506, user administration 1508, role administrations 1510, profile administration 1512, and document type administration 1514.

Home tab 1002, search tab 1004, upload tab 1006, subscriptions tab 1008, and settings tab 1010, are discussed above in conjunction with FIG. 10, above, and user detail 1502, notification settings 1504, change password 1506, user administration 1508, role administrations 1510, profile administration 1512, and document type administration 1514 are discussed above in conjunction with FIG. 15, above.

FIG. 16 shows notification settings 1601, which may include notification type 1602, frequency 1604, and automatically subscribe 1606 (in addition to the elements discussed above that are common to FIGS. 15-24). In other embodiments, settings page 1600 may not have all of the elements listed and/or may have other elements instead of or in addition to those listed.

Figure 16:
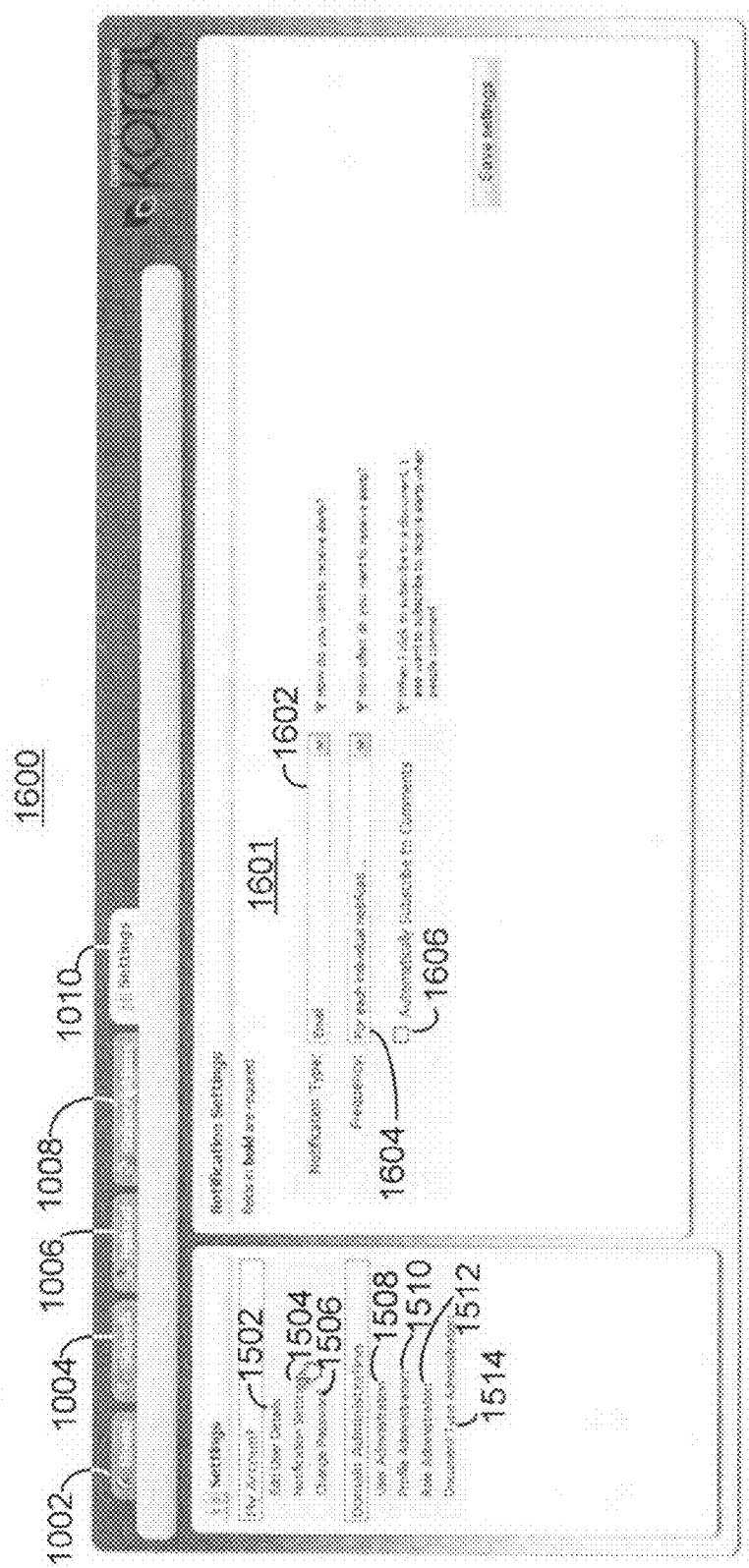

Notification settings 1601 may be used by the user and/or administrator to set preferences related to the notifications received about documents being updated. Notification type 1602 enables the user to select the type of notification of an update that the user would like to receive. In FIG. 16, the user has selected to receive the notification via e-mail. In an embodiment, the user may also be able to receive the notification via a RSS feed, for example. Frequency 1602 enables the user to select how frequently the user will receive the notification. For example, in an embodiment, the user may select whether to receive the notification every time the document is updated or once every night as part of a batch notification. Automatically subscribe 1606 allows the user to select whether to be automatically subscribed to the comments associated with a document for which the user is the author.

FIG. 17 shows a screenshot of an example of user information settings 1701, which includes filter-by-name 1702, send invite 1704, disable user 1706, enable user 1708, reset password 1710, add user 1712, email 1716, user names 1714, status 1718, and profile 1720 (in addition to the elements discussed above that are common to FIGS. 15-24). In other embodiments, settings page 1700 may not have all of the elements listed and/or may have other elements instead of or in addition to those listed.

User information settings 1701 shows information about one or more users, and may be viewed and/or edited by an administrator. Filter-by-name 1702 enables the administrator limit the users listed to a single name or a group of users that share the same name or that share a string of the same characters within their respective names. Filter-by-name 1702 may be used to search for the name of a particular user. Send invite 1704 allows an administrator to send an invitation to a user to join one or more groups that share a corresponding set of documents. Disable user 1706 allows the administrator to disable a particular user that is a member of a particular group. Once disabled, the user can no longer access the shared documents of the group that the user is a member of. A user may be disabled for any of a number of reasons. For example, the administrator may disable a user that was not behaving properly. As a security measure, a user that is absent for an extended period may be disabled. A user may also be temporarily disabled while performing maintenance to the system 16 and/or while making changes to the user's account. Enable user 1708 allows the administrator to enable a user that was previously disabled.

Reset password 1710 allows the administrator to reset the password of user, which may be desirable in any of a number of situations. For example, the user may forget their password, the user's password may become compromised, and/or the administrator may want to periodically force users to choose new passwords so that if a password does fall into the wrong hands, the unauthorized access is only a temporary even if none of the users or administrators are aware that the password is in the hands of an unauthorized person. Add user 1712 allows the administrator to add a user. Add user 1712 may allow the user to be added without consent of the user and/or may be used to add a user that accepted an invitation. Alternatively, accepting the invitation may add the user automatically, without the administrator performing any further action. User names 1714 is a list of user names. If filter-by-name 1702 is blank, user names 1714 may include the entire list of user names. If filter-by-name 1702 is not blank, then only user names that are not removed by the string of characters entered into filter-by-name 1702 are displayed in user names 1714. Emails 1716 are the emails of the users listed in user names 1714. Status 1718 displays the status of each user listed in user names 1714. Some examples of possible statuses that may be listed are active, inactive, invited, and/or disabled. Profile 1720 is a list of profiles that have been assigned to the corresponding user names of user names 1714. In an embodiment, if a user belongs to multiple groups (each having their own profile), the user's name is listed multiple times—once for each group to which the user is a member, and after each listing of the user name a different profile is listed in profiles 1720.

FIG. 18 shows a screenshot of an example of invite settings 1801, which includes name 1802, e-mail 1804, remove-last-user 1806, add-more-users 1808, select-a-profile 1810, and add-users-to-additional-workspace 1812 (in addition to the elements discussed above that are common to FIGS. 15-24). In other embodiments, settings page 1800 may not have all of the elements listed and/or may have other elements instead of or in addition to those listed.

Figure 17:
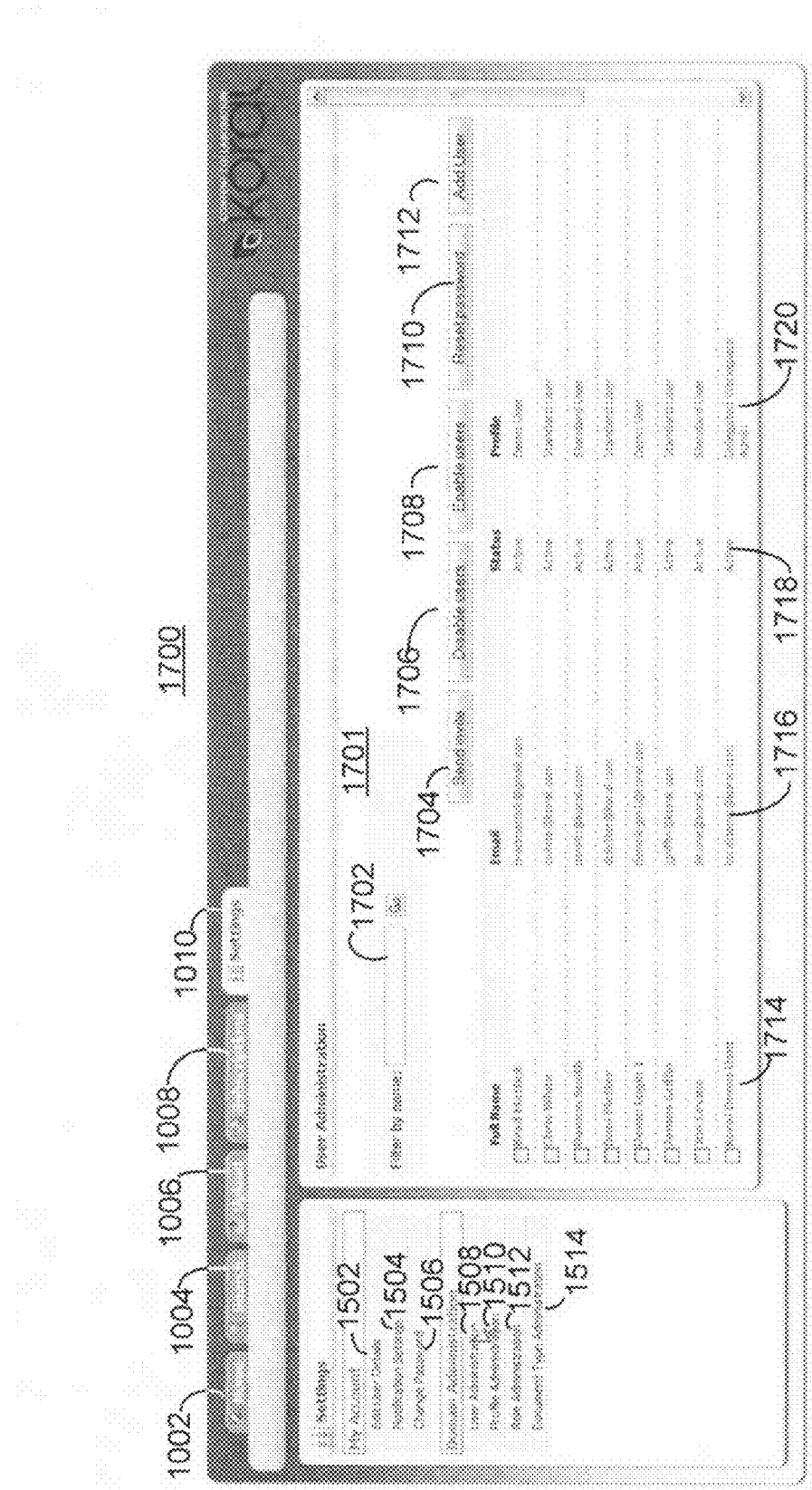
Figure 18:
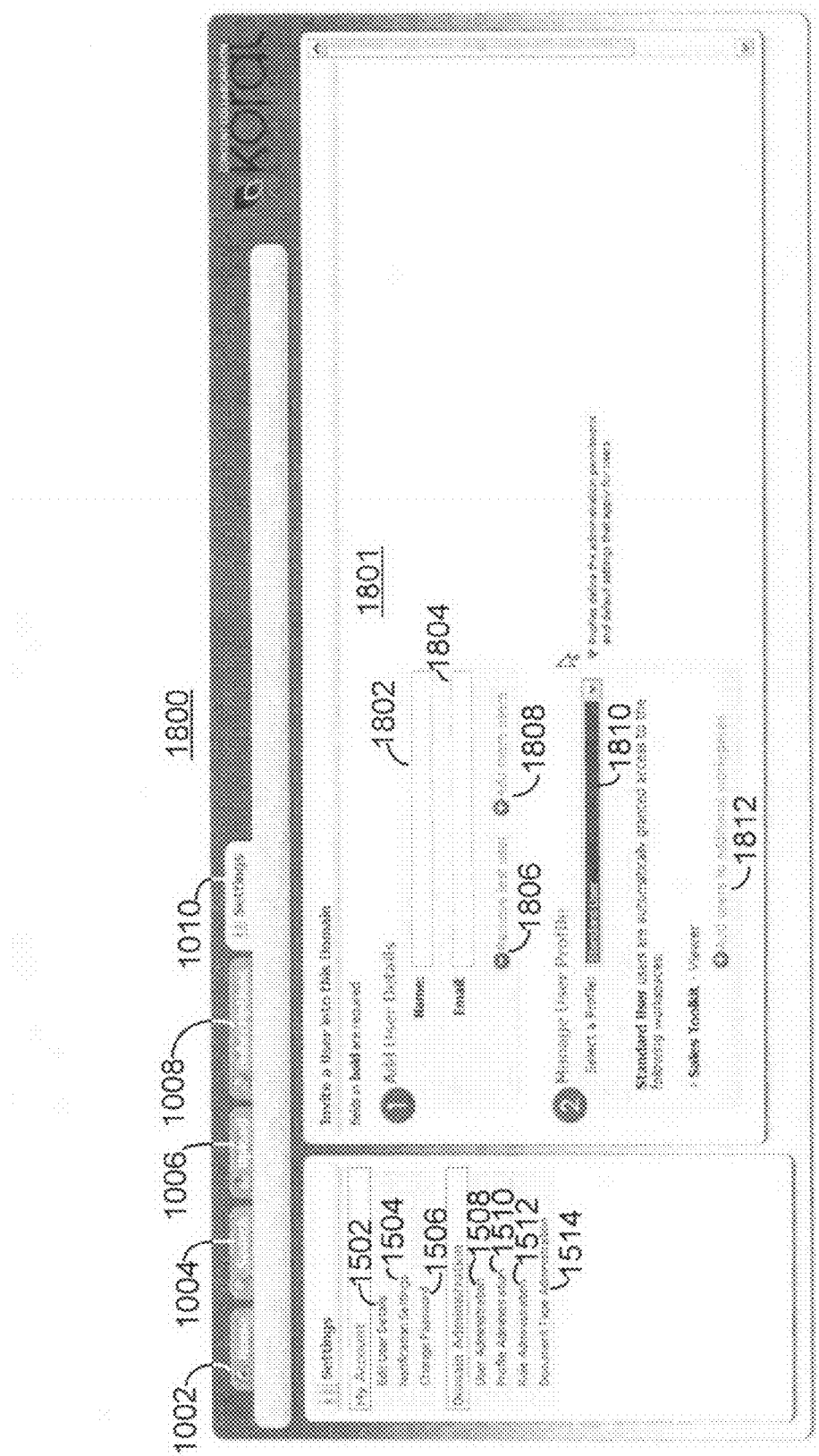
Figure 19:
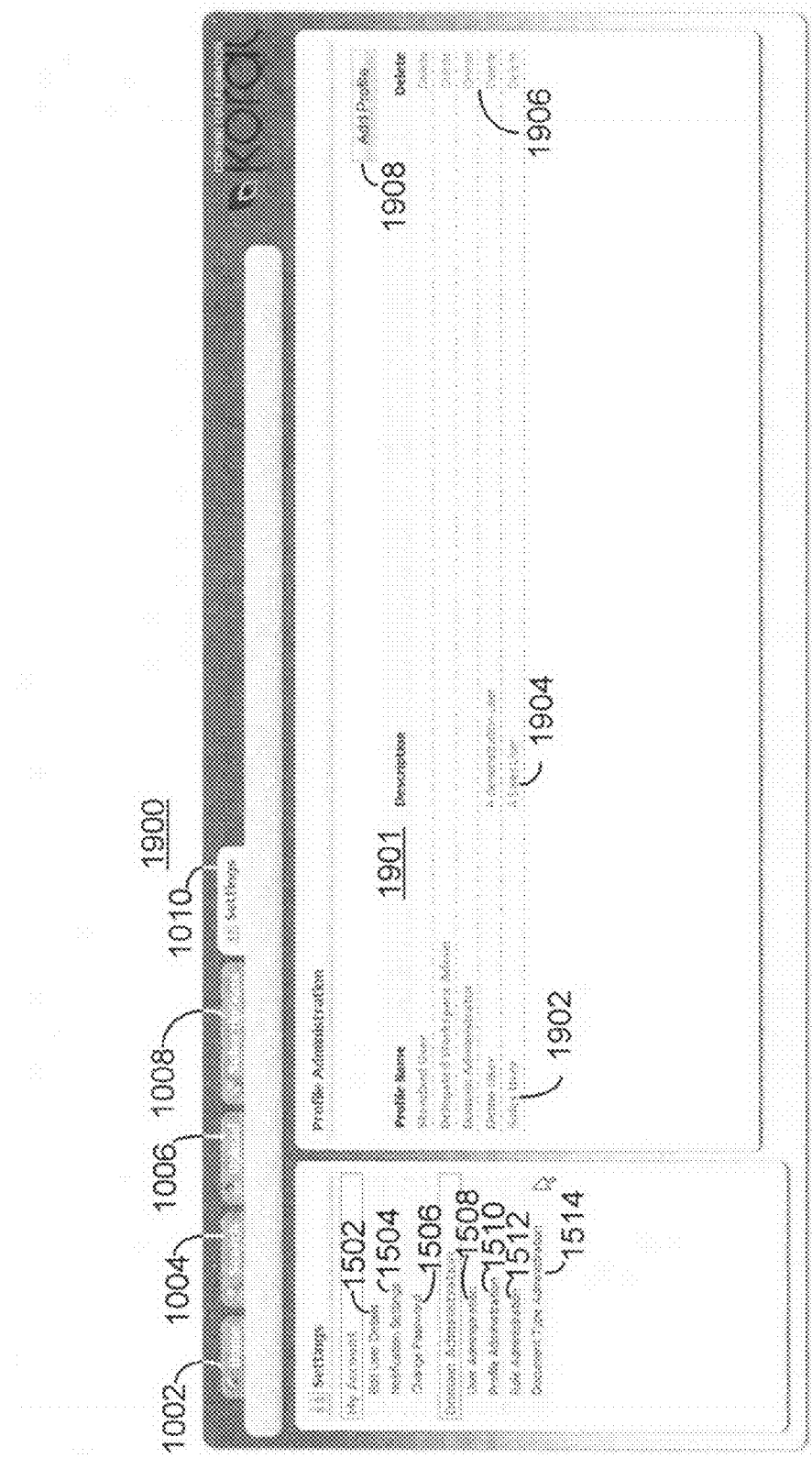
Figure 20:
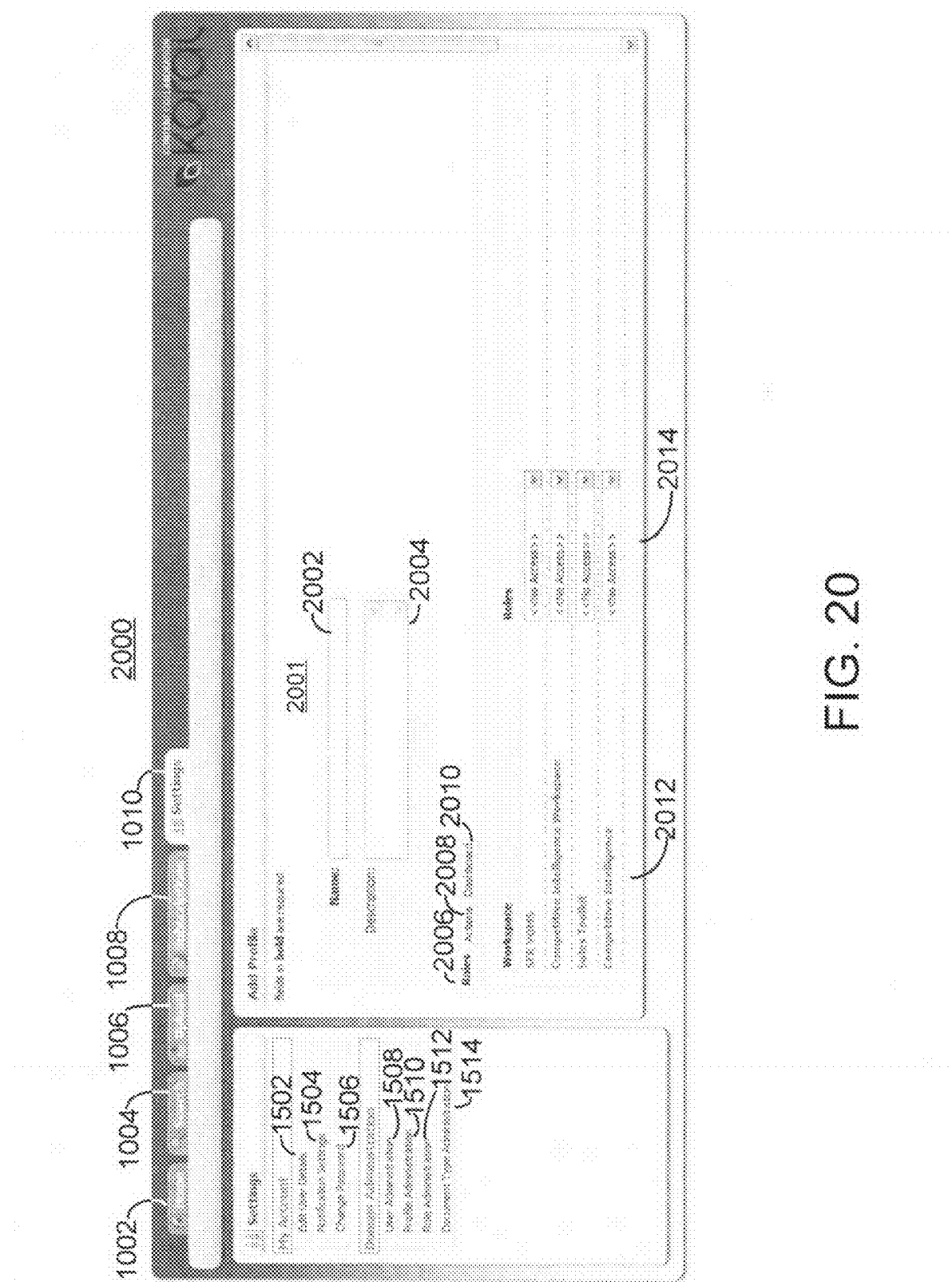
Figure 21:
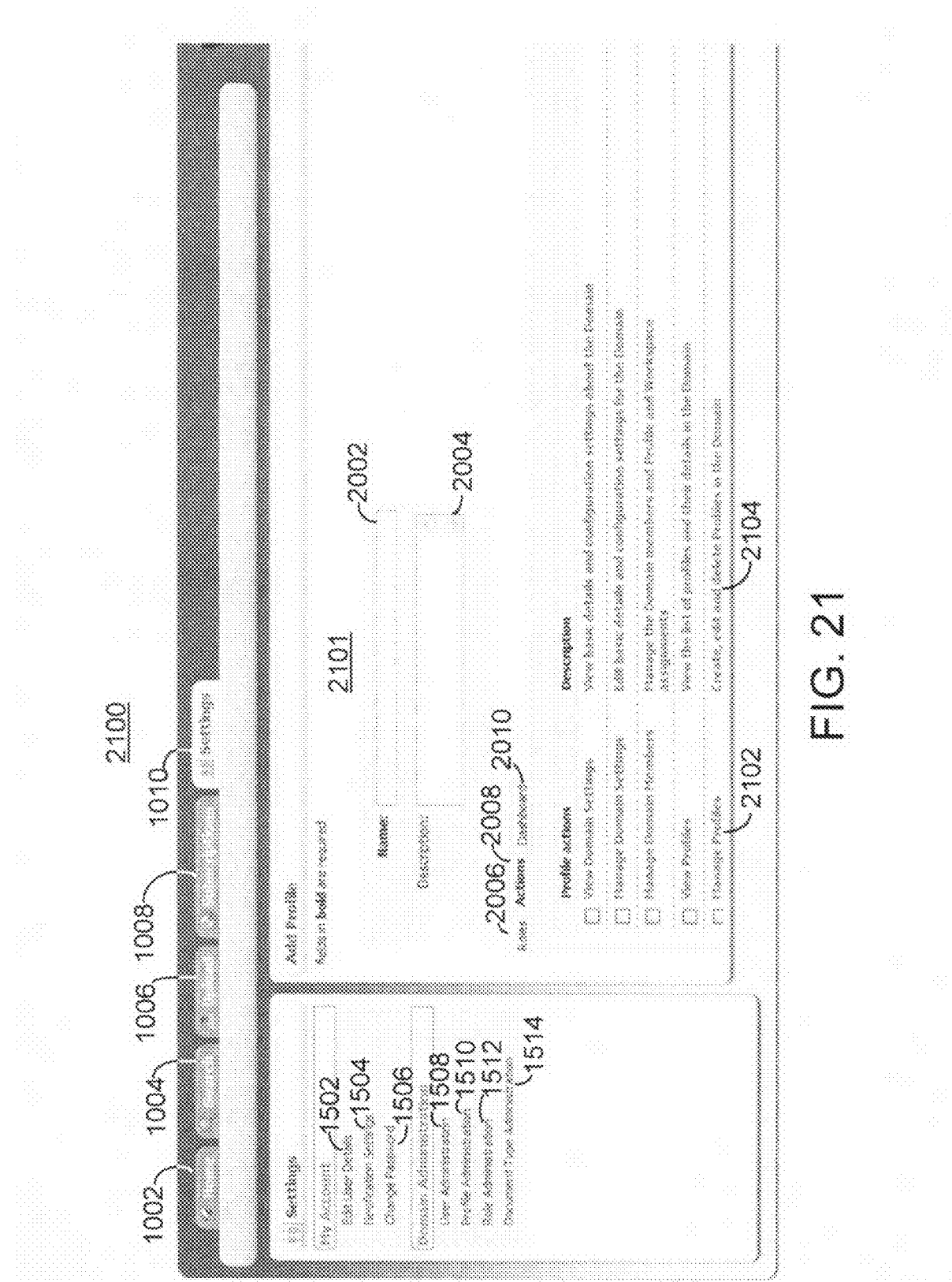
Figure 22:
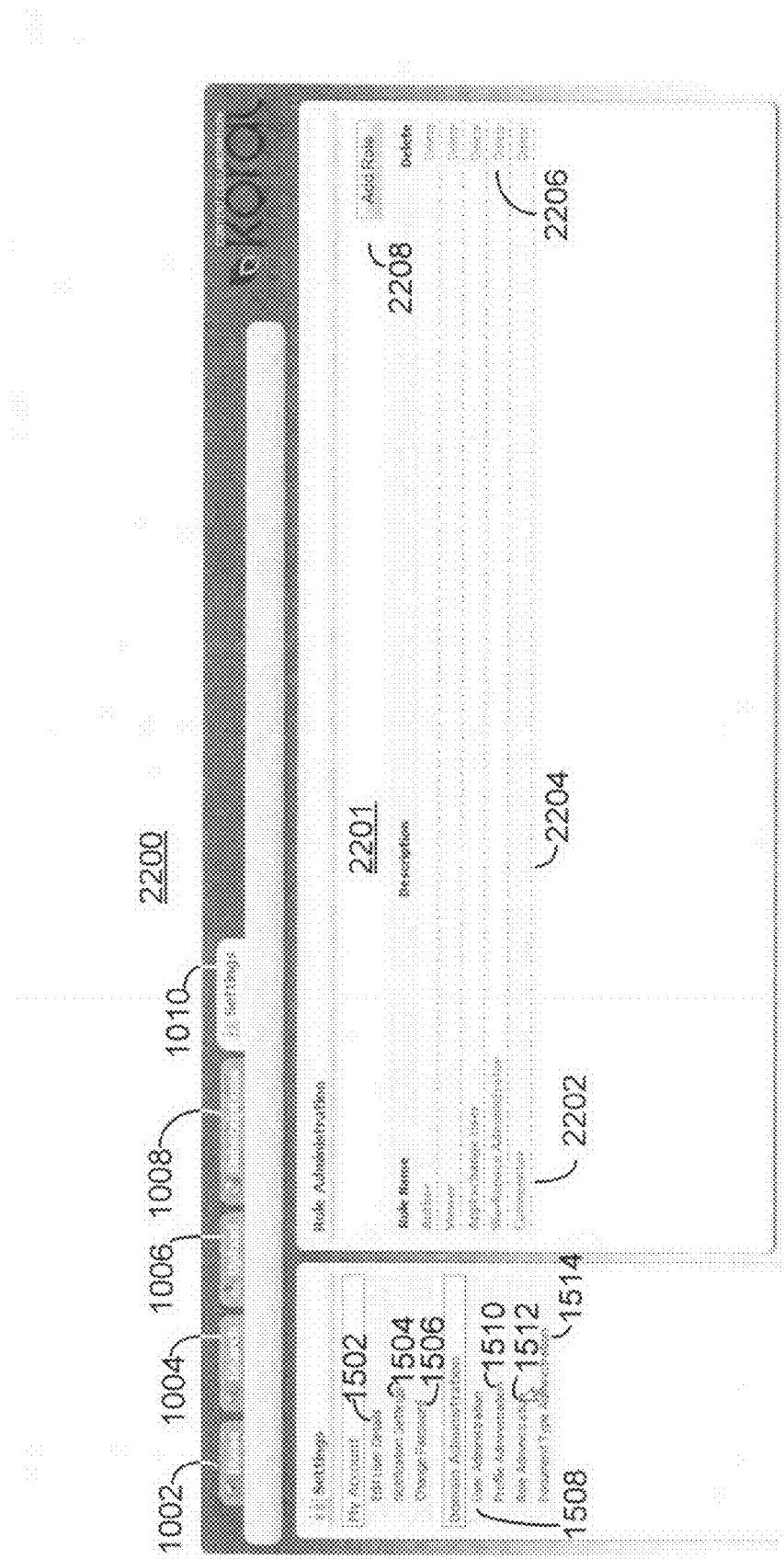
Figure 23:
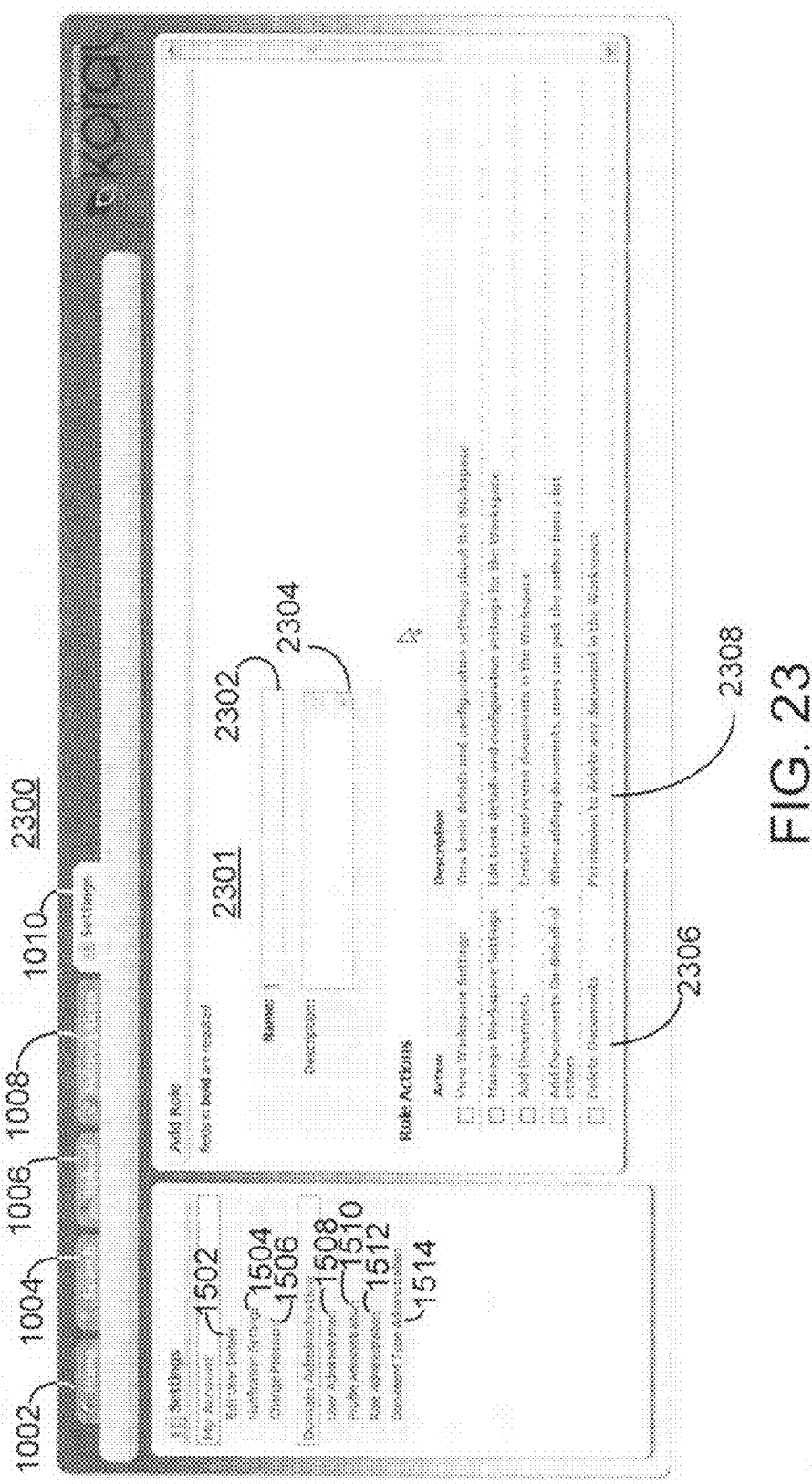
Figure 24:
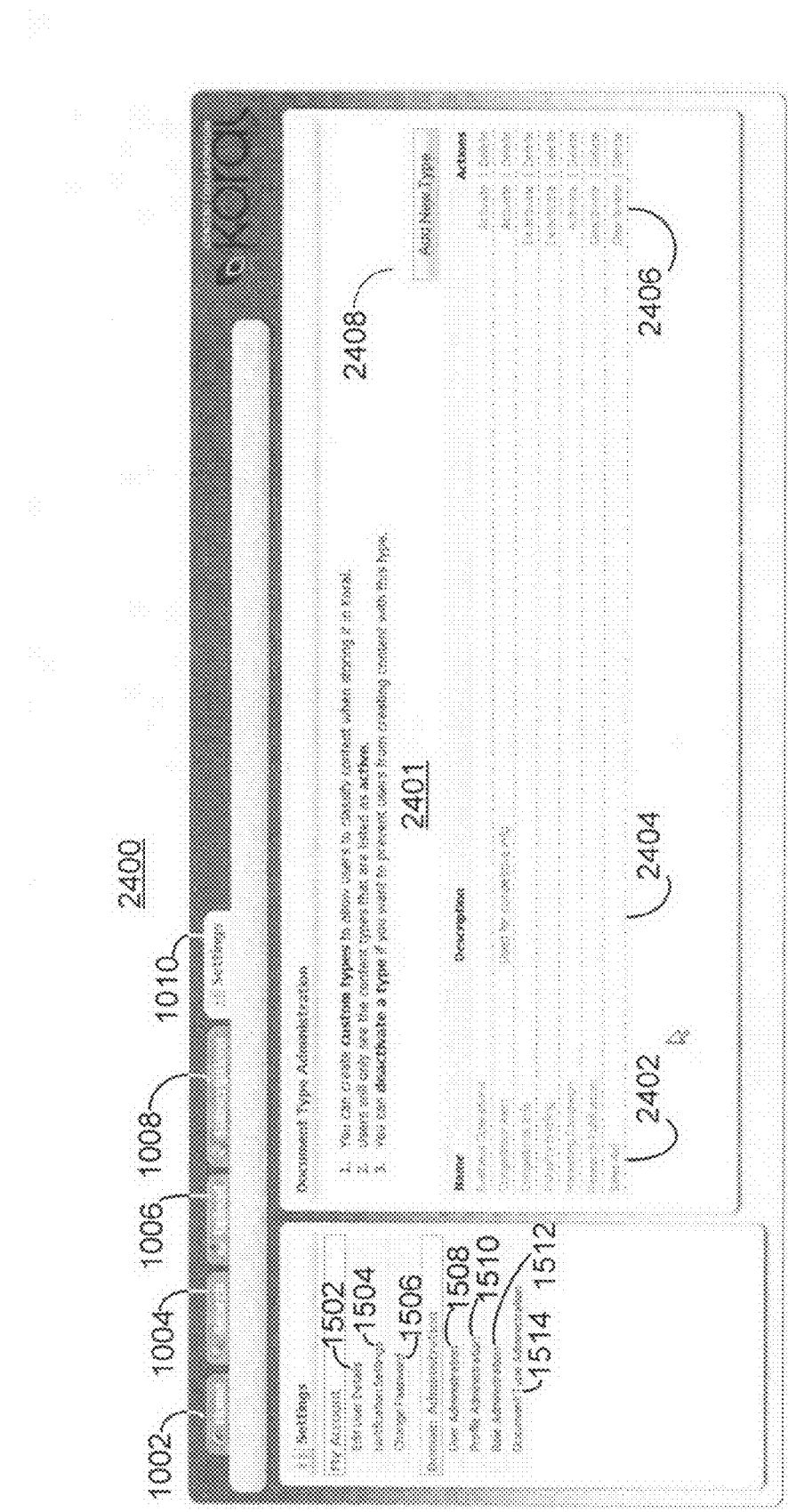

Invite settings 1801 is a webpage that may be used for inviting a user to join a group. Invite page 1801 may be presented in response to selecting send invite 1704 (FIG. 17). Name 1802 is a field in which an administrator may enter the name of a user that the administrator wishes to invite to join a group. E-mail 1804 is a field in which an administrator may enter an e-mail address to which the administrator desires to send the invitation. Remove-last-user 1806 may allow the administrator to remove the last user from being sent an invitation. Add-more-users 1808 may allow the administrator to add more invitations to a list of users to whom invitation will be sent. Select-a-profile 1810 allows the administrator to select a profile for a user, thereby selecting a group in which the user will be a member. Add-users-to-additional-workspace 1812 allows the administrator to grant users access to other workspaces.

FIG. 19 shows a screenshot of an example of profile administration settings 1901, which includes profile names 1902, descriptions 1904, delete links 1906, and add-profile 1908 (in addition to the elements discussed above that are common to FIGS. 15-24). In other embodiments, settings 1900 may not have all of the elements listed and/or may have other elements instead of or in addition to those listed.

Profile administration settings 1901 is a webpage that may be used for managing profiles. Using profile administrator 1901 the administrator may view a list of current profiles, delete profiles, and/or initiate creating a new profile. Profile administration settings 1901 may be presented in response to selecting profile administration 1510 (FIG. 15). Profile names 1902 is a list of profiles that are currently active. Descriptions 1904 are a list of descriptions (if present) of the profiles listed in profile names 1902. Each of descriptions 1904 corresponds to the name of the profile that is on the same line. Delete links 1906 are links that, when selected, cause the profile whose name is listed on the same line to be deleted. Add profile 1908 is a link that brings the administrator to a webpage for adding a new profile.

FIG. 20 shows a screenshot of an example of an add profile role settings 2001, which includes profile name 2002, description 2004, roles tab 2006, actions tab 2008, dashboard tab 2010, workspaces 2012, and roles 2014 (in addition to the elements discussed above that are common to FIGS. 15-24). In other embodiments, settings 2000 may not have all of the elements listed and/or may have other elements instead of or in addition to those listed.

Add profile role settings 2001 may be one or several webpages for creating a new profile. Add profile role settings 2001 may allow an administrator to select roles for that are assigned to a profile. Profile name 2002 is a field within which the administrator may insert the name that the administrator would like to assign to the new profile. Description 2004 includes a field within which the administrator inserts a description of the intended group of users to which the profile is expected to be assigned. Roles tab 2006 brings an administrator to webpage for selecting roles that will be associated with the new profile. In an embodiment, if add profile settings 2001 is not the current webpage, selecting roles tab 2006 causes add profile 2001 to be displayed. Actions tab 2008 brings the administrator to a webpage for selecting actions that members of the group are allowed to perform. Dashboard tab 2010 brings the administrator to a webpage that allows the administrator to select which windows are available to the user when viewing homepage 1000 (FIG. 10). Workspaces 2012 are a list of current workspaces available to document management system 301 (FIGS. 1 and 3). Roles 2014 are a column of pull down menus. Each pull down menu is associated with the workspace listed on the same row in workspaces 2012. Each of the pull down menu includes a list of roles that may be assigned to the workspace. Users that are assigned to the new profile will be able to access the workspaces listed in workspaces 2012 in the manners allowed by the corresponding roles listed in roles 2014. The names of workspaces may appear multiple times in workspaces 2012 so that more than one role may be assigned to the workspace. In an embodiment, if no role is chosen for a given workspace, then members of the new profile are not granted access to that workspace (unless the user is also a assigned to another profile that allows access to that workspace).

FIG. 21 shows a screenshot of an example of add profile settings 2101, which includes profile name 2002, description 2004, roles tab 2006, actions tab 2008, dashboard tab 2010, profile actions 2102, and description 2104 (in addition to the elements discussed above that are common to FIGS. 15-24). In other embodiments, settings page 2100 may not have all of the elements listed and/or may have other elements instead of or in addition to those listed.

Add profile action settings 2101 may be one of several a webpages for creating a new profile, and for selecting actions for that profile. Although a role may have one or more actions associated with the role, allowing the administrator to assign actions to a profile allows the administrator to assign a combination of actions that cannot be created by any combination of the roles currently available, without creating a new role. Profile name 2002, description 2004, roles tab 2006, actions tab 2008, and dashboard tab 2010 were described in conjunction with FIG. 20, above. Profile actions 2102 are a list of actions that may be selected by the administrator. The actions selected are available to those assigned to the new profile. Descriptions 2104 describe the actions of actions 2102. The description of descriptions 2104 that is in the same row as an action describes that action.

FIG. 22 shows a screenshot of an example of role administration settings 2201, which includes role names 2202, descriptions 2204, delete links 2206, and add role 2208 (in addition to the elements discussed above that are common to FIGS. 15-24). In other embodiments, settings page 2200 may not have all of the elements listed and/or may have other elements instead of or in addition to those listed.

Role administration settings 2201 is a page for managing roles. Role names 2202 lists the names of the roles available for the administrator to choose from. Description 2204 describes roles having role names 2202. Delete links 2206 are links that may be used to delete a role. Add role 2208 brings the user to a page that enables the administrator to add a role.

FIG. 23 shows a screenshot of an example of add role settings 2301, which includes role name 2302, description 2304, actions 2306, and descriptions 2308 (in addition to the elements discussed above that are common to FIGS. 15-24). In other embodiments, settings page 2300 may not have all of the elements listed and/or may have other elements instead of or in addition to those listed.

Add role settings 2301 is a page for adding, removing, and/or deleting roles. Selecting add role 2208 (FIG. 22) may bring the administrator to add role settings 2301. Role name 2302 is the name that the administrator may assigns to the new role that is being added by entering the name into the field associated with role name 2302. Description 2304 is used by the administrator to enter the description of the role that the administrator feels is appropriate. Actions 2306 lists the names of the actions available for the administrator to choose from. The combination of actions selected by the administrator may become the combination of actions that make up the new role. In an embodiment, the administrator selects an action by selecting a corresponding checkbox. Description 2308 may describe the actions that are named in actions 2306. The description describes the action that is in the same row.

FIG. 24 shows a screenshot of an example of document type administration settings 2401, which includes document types 2402, descriptions 2404, actions 2406, and add new type 2408 (in addition to the elements discussed above that are common to FIGS. 15-24). In other embodiments, settings page 2400 may not have all of the elements listed and/or may have other elements instead of or in addition to those listed.

Document type administration settings 2401 is a page for managing document types. Document types 2402 lists the names of the document types available for the user to choose from. Descriptions 2404 describe document types 2402. The description and document type that are on the same row correspond to one another, such that the description describes the document type. Actions 2406 are links that may be used to delete or activate a document type. Add new type 2408 brings the user to a page that enables the administrator to add a document type. In an embodiment, each document type may be nothing more than a name of a type of document that is available for the users to associate with any document.

Figure 25:
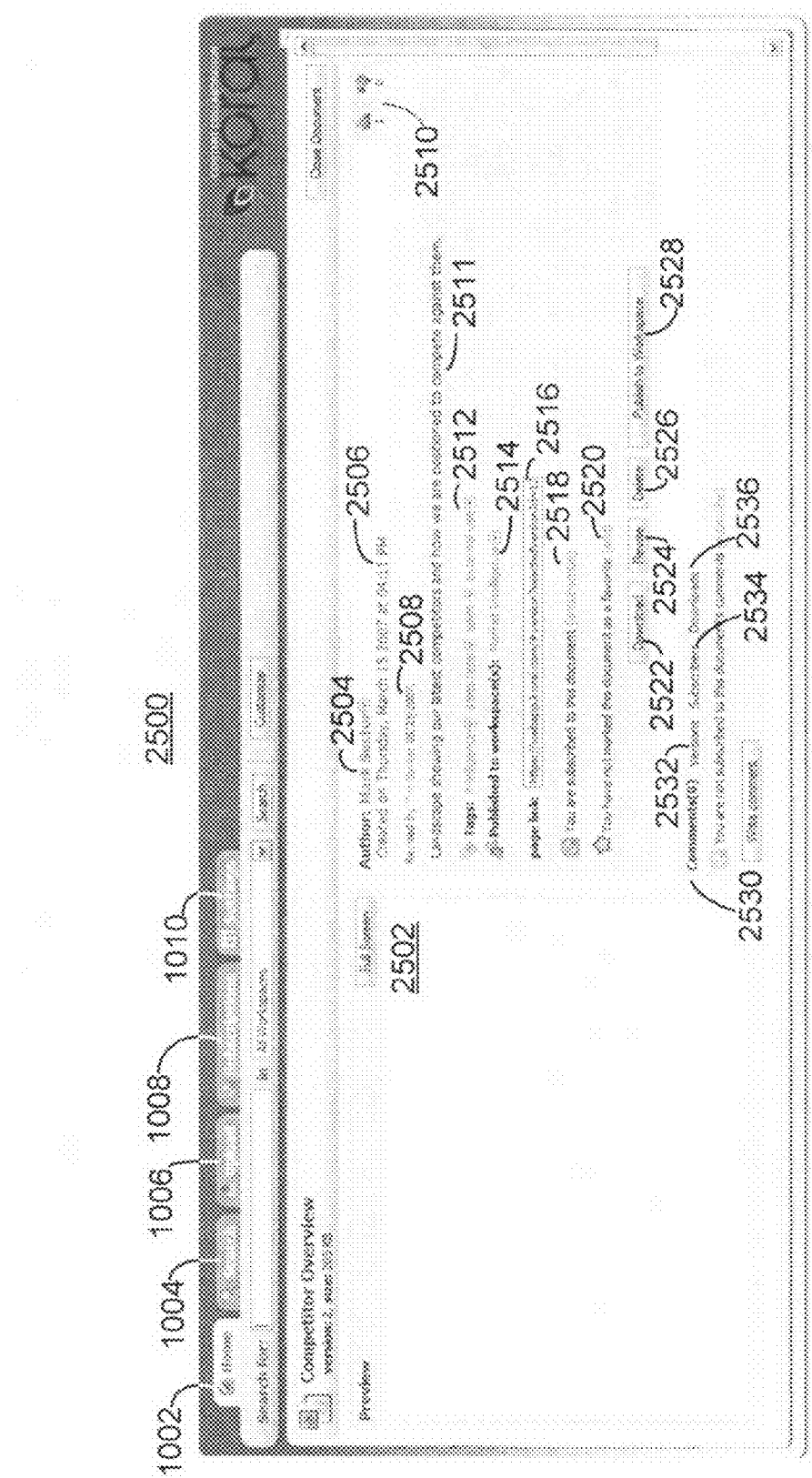
FIG. 25 illustrates a screenshot of an example of a document page of a website for sharing documents.

FIG. 25 is a screenshot of an embodiment of a document webpage 2500 for viewing details about a document. Document webpage 2500 includes preview 2502, author 2504, creation date 2506, revision data 2508, vote 2510, description 2511, tags 2512, workspace 2514, page link 2516, subscription indication 2518, favorites indication 2520, download button 2522, revise button 2524, delete button 2526, publish to workspace button 2528, comments tab 2530, version tab 2532, subscribers tab 2534, and downloads 2536. In other embodiments, document webpage 2500 may not have all of the elements listed and/or may have other elements instead of or in addition to those listed.

Document webpage 2500 includes information about a document stored in document management storage 302. Selecting one of the documents in one of the boxes of homepage 1000 or search page 1100 causes a document webpage 2500 to be presented. Preview 2502 shows an excerpt of the document. Author 2504 includes the name or an identifier of the author of the document. Creation date 2506 is the date at which the document was created or first uploaded to document management system 301. Revision data 2508 may include the name of the last person to revise the document, the date of the most recent revision, and/or other information about the revisions of the document. Vote 2510 is an indication of how many people voted for and/or against the document. There may also be a link for placing a vote for and/or against the document. Description 2511 may include a brief description of the document. Tags 2512 are a list of tags that are associated with the document. Workspace 2514 is a list of workspaces where the document is stored. Page link 2516 is a link to the location (e.g, a URL) where the document can be found.

Subscription indication 2518 indicates whether the current user is subscribed to the document. Subscription indication 2518 may include a button that initiates and/or terminates a subscription to a document. Favorites indication 2520 indicates whether the current user has the document included within the user's list of favorite documents to view, each listing in the favorites list may be associated with a link (e.g., a shortcut) to the document. Favorites indication 2520 may include a button that adds and/or removes the document from being on a list of links to documents (e.g., favorite documents) to view. Download button 2522 initiates a download of the document from document management system 301 (FIGS. 1 and 3) to user system 12 (FIGS. 1 and 2). Revise button 2524 initiates a process that allows the user to revise the document. Delete button 2526 causes the document to be deleted. Publish to workspace 2528 causes the document to be published to a workspace where other members of the group may view and/or edit the document. Comments tab 2530 brings the user to a webpage that allows the user to view comments added by others and/or add comments about the document. Version tab 2532 brings the user to a webpage that allows the user to view other versions (e.g., older versions) of the document. Subscribers tab 2534 brings the user to a page that allows the user to view a list of subscribers. Downloads 2536 allows the user to view documents and/or revisions that were recently downloaded to update the document.

Method for Using the Environment (FIGS. 1 and 2)

Figure 26:
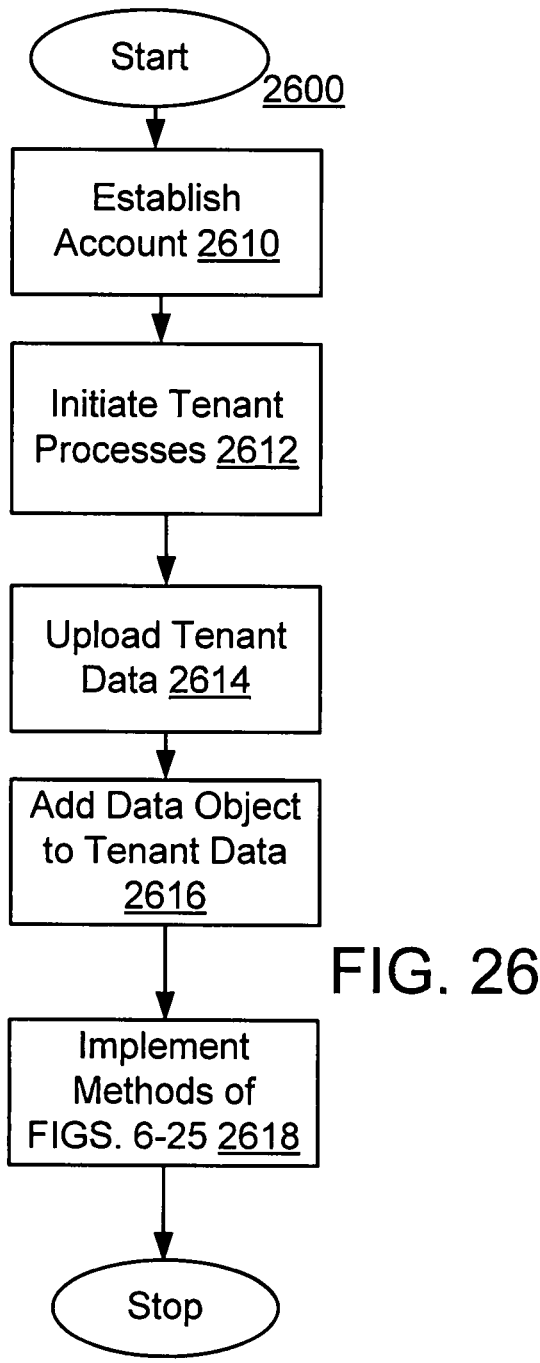
FIG. 26 illustrates a flowchart of an embodiment of a method of using the environment of FIG. 1.

FIG. 26 shows a flowchart of an example of a method 2600 of using environment 10. In step 2610, user system 12 (FIGS. 1 and 2) establishes an account. In step 2612, one more tenant process space 104 (FIG. 2) are initiated on behalf of user system 12, which may also involve setting aside space in tenant space 112 (FIG. 2) and tenant data 114 (FIG. 2) for user system 12. Step 2612 may also involve modifying application metadata to accommodate user system 12. In step 2614, user system 12 uploads data. In step 2616, one or more data objects are added to tenant data 114 where the uploaded data is stored. In step 2618, methods and the code for generating the webpages associated with FIGS. 6-25 may be implemented. The user of method 2600 may represent an organization that is a tenant of system 16 (FIG. 1) or may be associated with the tenant. In an embodiment, each of the steps of method 2600 is a distinct step. In another embodiment, although depicted as distinct steps in FIG. 26, steps 2602-2618 may not be distinct steps. In other embodiments, method 2600 may not have all of the above steps and/or may have other steps in addition to or instead of those listed above. The steps of method 2600 may be performed in another order. Subsets of the steps listed above as part of method 2600 may be used to form their own method.

Method for Creating the Environment (FIGS. 1 and 2)

Figure 27:
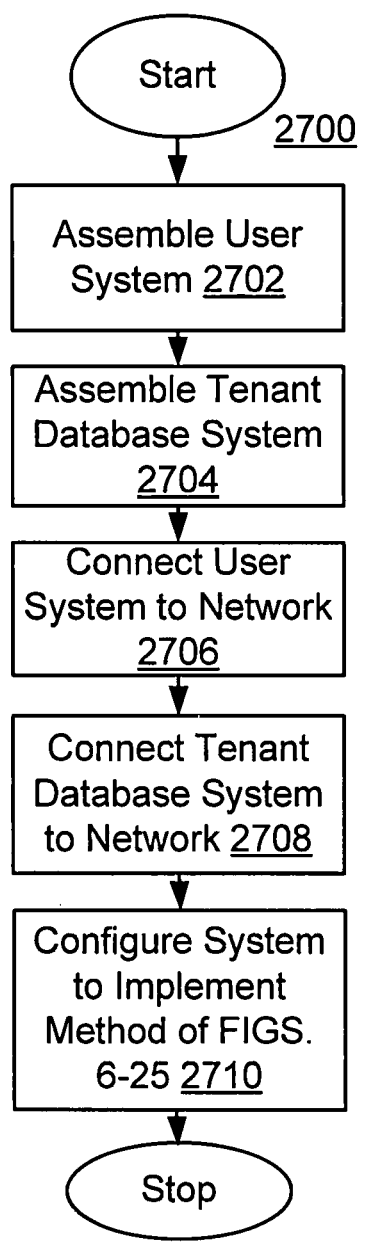
FIG. 27 illustrates a flowchart of a method of making the environment of FIG. 1.

FIG. 27 is a method of making environment 10, in step 2702, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 2704, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100₁-100ₙ, system process space 102, tenant process spaces 104, tenant management process space 110, tenant space 112, tenant data 114, and application metadata 116 (FIG. 2).

In step 2706, user system 12 is communicatively coupled to network 104. In step 2708, system 16 is communicatively coupled to network 104 allowing user system 12 and system 16 to communicate with one another (FIG. 2). In step 2710, one or more instructions may be installed in system 16 (e.g., the instructions may be installed on one or more machine readable media, such as computer readable media, therein) and/or system 16 is otherwise configured for performing the steps of methods and generating the webpages associated with FIGS. 6-25. For example, as part of step 2710, one or more instructions may be entered into the memory of system 16 for creating document management storage 302, transferring documents to the document management storage, implementing server-side tracker 307, generating and updating IDs 306a-n, uploading documents, storing documents, searching for documents, subscribing user to subscription, and/or inviting users to join a group that is authorized to access the document management storage 302 (FIG. 3). In an embodiment, each of the steps of method 2700 is a distinct step. In another embodiment, although depicted as distinct steps in FIG. 16, steps 2702-2708 may not be distinct steps. In other embodiments, method 2700 may not have all of the above steps and/or may have other steps in addition to or instead of those listed above. The steps of method 2700 may be performed in another order. Subsets of the steps listed above as part of method 2700 may be used to form their own method.
Extensions and Alternatives In an embodiment, a timestamp of the last time that the document was altered may be included in ID 500 instead of, or in addition to, version number 502 and/or hash value 504 (FIG. 5). In an embodiment, only one of version number 502 and hash value 504 is included in ID 500. In an embodiment, version number 502 is a value that is incremented every time that that document is altered. In an embodiment, version number 502 is a value that is decremented every time that a document is altered.

In an embodiment only the latest approved version of a document is available for viewing by users. For example, a first user downloads a document to their user system. Then a second user updates the document in the system. System 16 may be configured to route document changes entered by the second user to a workflow, so that document changes can be approved before being published. While the document in undergoing an approval workflow (in other words, prior to the changes being approved), if the first user opens the document the first user will not be notified of any of the changes made by the second user, because the first user is still viewing the latest approved document. When the document is approved, the first user would be notified if the document is opened on the first user's desktop.

In an embodiment, the downloading of a document from document management storage 302 (FIG. 3) to the user's system may entail the following steps on the client side. In one of the steps the user sends a request for a copy of one of documents 304a-n (FIG. 3). In one of the steps, the user's system receives a copy of the document (document 406 of FIG. 4). In one of steps the document is stored in a location in memory 400 (FIG. 4). In one of the steps client-side tracker 410 (FIG. 4) records the location of where document 400 is located, so that client-side tracker only needs to monitor the locations to where the documents were downloaded in order to determine whether one of the documents downloaded from document management system 301 (FIG. 3) was opened. In another embodiment, upon installation or at another time, the user designates a particular location where all documents that were downloaded from document management system 301 will be stored, and when downloading a document from document management system 301, client-side tracker 410 ensures that the document is stored in the designated location. Alternatively, client-side tracker 410 tracks the entire user system or is triggered to launch by the opening of document 406 (FIG. 4). In an embodiment, the client-side tracker 410 may include a file browser for browsing documents in document management storage 302.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for pushing data to a plurality of subscribers at a plurality of organizations, comprising:

receiving at a machine resident database system a request for a subscription, the subscription being associated with receiving, at a client machine, information related to a document stored on behalf of a first organization in a workspace at the machine, the client machine being physically distinct from the machine resident database system, wherein the workspace is associated with a granting of a level of access that allows access to multiple subscribers that are allowed to simultaneously access the document, simultaneously modify the document, and store the document, after being modified, as a master copy of the document at the machine resident database, the master copy not having a lock, the request including subscription information, the workspace and document are accessible only to subscribers associated with the first organization, the subscription being for a document stored within the workspace, the document having an identifier that uniquely identifies both the document and the version of the document;

storing, at the machine resident database system, the request, the request being stored to a portion of the database system limited to information of the first organization;

querying the database system, for the subscription information for at least the first organization to determine whether a subscriber is to receive a copy of the document when the document is modified;

comparing, by the machine resident database, the unique document identifier of the master document with a unique document identifier of another copy of the document to determine whether the master document has changed since the other copy was created prior to replacing the master version of the document;

replacing, by the machine resident database, the master copy of the document with a modified version of the document, wherein the modified version of document that replaces the master copy of the document becomes a new version of the master copy of the document;

generating, by the machine resident database, a new unique identifier for the master copy that uniquely identifies the new version of the master document based on the modified version of the document; and after the replacing, sending from the machine resident database, a copy of the modified version of the document to a subscriber having a subscription that requests copies of the document when the document, is modified.

2. The method of claim 1, further comprising sending a notification of any update of the document to the subscriber based on results of the querying.

3. The method of claim 2, the sending of the notification being via sending an e-mail.

4. The method of claim 1, further comprising notifying the subscriber of an update to the document via a Really Simple Syndication feed, based on the querying.

5. The method of claim 1, further comprising:
sending a request for a frequency at which the querying is performed.

6. The method of claim 1, the request including an identification of the document to which the subscription is requested.

7. The method of claim 1, the request including an identification of a tag that is associated with the document, and the subscription being for a document associated with the tag.

8. The method of claim 1, the request including an identification of an author that authored the document, and the subscription being for a document authored by the author.

9. The method of claim 1, the request being received from a user.

10. The method of claim 1, the request being received from an administrator.

11. The method of claim 1, further comprising receiving a revision of the document, the querying being performed in response to receiving the revision.

12. The method of claim 1, further comprising receiving a comment about the document, the querying being performed in response to receiving the comment.

13. The method of claim 1, further comprising:
sending a notification of an update of the document to the subscriber based on results of the querying;
providing an option to a user to choose whether to receive the notification via e-mail or via a Really Simple Syndication feed, based on the querying;
providing an option to an administrator to force a subscription by at least
determining one member of the first organization that is to have a subscription, and
causing the receiving of the request on behalf of the at least one member, the determining and the causing being caused by at least assigning a subscription to a profile, and
assigning the profile to the subscriber, therein assigning the subscription to the subscriber;
sending a request for a frequency at which the sending of the notification is performed;
providing an option to choose
whether the request includes an identification of the document to which the subscription is requested,
whether the request includes an identification of a tag that is associated with the document,
whether the request includes an identification of an author that authored the document, and
whether the request includes an identification of a workspace in which the document is stored;
providing an option to select whether the querying is performed in response to receiving a revision of the document; and
providing an option to select whether the querying is performed in response to receiving a comment about the document.

14. A method for pushing data to a plurality of subscribers at a plurality of organizations, comprising:
sending, from a machine resident database system to a client machine, a request for a subscription associated with receiving information related to a document stored on behalf of a first organization, the request including subscription information, the document being accessible by a group of users, the client machine being physically distinct from the machine resident database system; the group of users including at least two users; the document having an identifier that uniquely identifies both the document and the version of the document;
receiving, at the client machine, an indication of a user of the client machine being granted a level of access shared by members of the group of users, the level of access allows the document to be modified, and after being modified, allows the modified document to be sent to the machine resident database as a master copy of the document, the level of access allows the document to be modified while others of the group of users are modifying the document, and the document not being locked;
receiving from the database system a notification related to a change made to the master copy of the document by another member of the group of users;
downloading software from the machine resident database system onto the client machine, the software including one or more machine instructions which, when implemented by the subscriber machine, establishes a hook that is triggered by opening the document, and as a result of being triggered the hook causes a check to be performed to determine whether a document on the subscriber machine has been updated since the last time the document was opened by the subscriber;
sending to the machine resident database, a request for information for determining whether the master document has changed since the other copy of the document stored on the client machine was created;
replacing, by the machine resident database system, the master copy of the document with a modified version of the document, wherein the modified version of the document that replaces the master copy becomes the master copy of the document; and
after the replacing, sending, by the machine resident database system, a copy of the modified version of the document to a subscriber having a subscription that requests copies of the document when the document is modified.

15. A non-transitory machine-readable medium storing thereon one or more instructions, which when implemented cause a processor to implement a method for pushing data to a plurality of subscribers at a plurality of organizations, the method comprising:
receiving at a machine resident database system, a request for a subscription, the subscription being associated with receiving, at a client machine, information related to a document stored on behalf of a first organization, the client machine being physically distinct from the machine resident, database system, wherein the document stored on behalf of the first organization, at the machine resident database, does not have a lock and may be simultaneously accessed and simultaneously modified by subscribers to the document, the request including subscription information; the document having an identifier that uniquely identifies both the document and the version of the document;

storing, at the machine resident database system, the request, the request being stored to a portion of the database system limited to information of the first organization;

querying, the database system, for the subscription information for at least the first organization to determine whether a subscriber is to receive a copy of the document when the document is modified;

comparing, by the machine resident database, the unique document identifier of the master document with a unique document identifier of another copy of the document to determine whether the master document has changed since the other copy was created prior to replacing the master version of the document;

replacing, by the machine resident database, the master copy of the document with a modified version of the document, wherein the modified version of document that replaces the master copy of the document becomes a new version of the master copy of the document;

generating, by the machine resident database, a new unique identifier for the master copy that uniquely identifies the new version of the master document based on the modified version of the document; and after the replacing, sending from the machine resident database, a copy of the modified version of the document to a subscriber having a subscription that requests copies of the document when the document is modified.

16. The machine-readable medium of claim 15, the method further comprising sending a notification of any update of the document to the subscriber based on results of the querying.

17. The machine-readable medium of claim 16, the sending of the notification being via sending an e-mail.

18. The machine-readable medium of claim 15, the method further comprising notifying the subscriber of an update to the document via a Really Simple Syndication feed, based on the querying.

19. The machine-readable medium of claim 15, the method further comprising:
forcing a subscription by determining that at least one group of members includes at least one member of the first organization that is to have a subscription; and
the forcing causing the receiving of the request on behalf of the at least one group.

20. The machine-readable medium of claim 19, the method further comprising:
assigning a subscription to a profile, and
assigning of the profile to the subscriber, thereby assigning the subscription to the subscriber.

21. The machine-readable medium of claim 15, the method further comprising:
sending a request for a frequency at which the querying is performed.

22. The machine-readable medium of claim 15, the request including an identification of the document to which the subscription is requested.

23. The machine-readable medium of claim 15, the request including an identification of a tag that is associated with the document, and the subscription being for a document associated with the tag.

24. The machine-readable medium of claim 15, the request including an identification of an author that authored the document, and the subscription being for a document authored by the author.

25. The machine-readable medium of claim 15, the request being received from a user.

26. The machine-readable medium of claim 15, the request being received from an administrator.

27. The machine-readable medium of claim 15, the method further comprising receiving a revision of the document, the querying being performed in response to receiving the revision.

28. The machine-readable medium of claim 15, the method further comprising receiving a comment about the document, the querying being performed in response to receiving the comment.

29. The machine-readable medium of claim 15, the method further comprising:
sending a notification of an update of the document to the subscriber based on results of the querying;
providing an option to a user to choose whether to receive the notification via e-mail or via a Really Simple Syndication feed, based on the querying;
providing an option to an administrator to force a subscription by at least determining one member of the first organization that is to have a subscription, and
causing the receiving of the request on behalf of the at least one member, the determining and the causing being caused by at least assigning a subscription to a profile, and
assigning the profile to the subscriber, therein assigning the subscription to the subscriber;
sending a request for a frequency at which the sending of the notification is performed;
providing an option to choose
whether the request includes an identification of the document to which the subscription is requested,
whether the request includes an identification of a tag that is associated with the document,
whether the request includes an identification of an author that authored the document, and
whether the request includes an identification of a workspace in which the document is stored;
providing an option to select whether the querying is performed in response to receiving a revision of the document; and
providing an option to select whether the querying is performed in response to receiving a comment about the document.

30. A machine resident database system for storing documents tracked on behalf of a plurality of organizations, the database system comprising:
a processor system,
a memory system including at least volatile memory, and non-volatile memory; the non-volatile memory including at least one machine readable medium carrying one or more sequences of instructions which when implemented causes the processor system to implement a method comprising:
receiving at a machine resident database system, a request for a subscription, the subscription being associated with receiving, at a client machine, information related to a document stored on behalf of a first organization, the request including subscription information; the document having an identifier that uniquely identifies both the document and the
version of the document; the client machine being physically distinct from the machine resident database system;
storing, at the machine resident database system, the request, the request being stored to a portion of the database system limited to information of the first organization;
querying the database system, for the subscription information for at least the first organization to determine whether a subscriber is to receive a copy of the document when the document is modified;
forcing a subscription by determining that at least one group of members, having at least two members, includes at least one member of the first organization that is to have a subscription; and
the forcing causing the receiving of the request on behalf of the at least one group;
comparing, by the machine resident database, the unique document identifier of the document
with a unique document identifier of another copy of the document to determine whether the document has changed since the other copy was created prior to replacing the document with the other copy of the document;
replacing, by the machine resident database, the document with a modified version of the
document, wherein the modified version of document that replaces the master copy of the document becomes a new version of the master copy of the document:
generating, by the machine resident, database, a new unique identifier for the master copy that uniquely identifies the new version of the master document based on the modified version of the document; and
after the replacing, sending from the machine resident database, a copy of the modified version of the document to a subscriber having a subscription that requests copies of the document when the document, is modified.

31. The machine resident database system of claim 30, the method further comprising sending a notification of any update of the document to the subscriber based on results of the querying.

32. The machine resident database system of claim 31, the sending of the notification being via sending an e-mail.

33. The machine resident database system of claim 30, the method further comprising notifying the subscriber of an update to the document via a Really Simple Syndication feed based on the querying.

34. The machine resident database system of claim 30, the method further comprising:
assigning a subscription to a profile, and
assigning of the profile to the subscriber, thereby assigning the subscription to the subscriber.

35. The machine resident database system of claim 30, the method further comprising:
sending a request for a frequency at which the querying is performed.

36. The machine resident database system of claim 30, the request including an identification of the document to which the subscription is requested.

37. The machine resident database system of claim 30, the request including an identification of a tag that is associated with the document, and the subscription being for a document associated with the tag.

38. The machine resident database system of claim 30, the request including an identification of an author that authored the document, and the subscription being for a document authored by the author.

39. The machine resident database system of claim 30, the request being received from a user.

40. The machine resident database system of claim 30, the request being received from an administrator.

41. The machine resident database system of claim 30, the method further comprising receiving a revision of the document, the querying being performed in response to receiving the revision.

42. The machine resident database system of claim 30, the method further comprising receiving a comment about the document, the querying being performed in response to receiving the comment.

43. The machine resident database system of claim 30, the method further comprising:
sending a notification of an update of the document to the subscriber based on results or the querying;
providing an option to a user to choose whether to receive the notification via e-mail or via a
Really Simple Syndication feed based on the querying;
providing an option to an administrator to force a subscription by at least
determining one member of the first organization that is to have a subscription, and
causing the receiving of the request on behalf of the at least one member, the determining
and the causing being caused by at least
assigning a subscription to a profile stored in the memory system, and
assigning the profile to the subscriber, therein assigning the subscription to the subscriber;
sending a request for a frequency at which the sending of the notification is performed;
providing an option to choose
whether the request includes an identification of the document to which the subscription is requested,
whether the request includes an identification of a tag that is associated with the document,
whether the request includes an identification of an author that authored the document, and
whether the request includes an identification of a workspace in which the document is stored;
providing an option to select whether the querying is performed in response to receiving a revision of the document; and
providing an option to select whether the querying is performed in response to receiving a comment about the document.

44. The method of claim 1, the first organization being one of multiple organizations,
the portion of the database system that is limited to the first organization being one of multiple portions of the database system, each portion being limited to a different one of the multiple organizations
the machine resident database system stores data, workspaces, and subscriptions for the multiple organizations, the data, workspaces, and subscriptions associated with each organization being kept in one of the portions separately from data, workspaces, and subscriptions associated with other organizations, the data, workspaces, and subscriptions associated with each organization accessible only to its respective organization or subscribers associated with the respective organization, via its respective portion.

45. A method for pushing data to a plurality of subscribers at a plurality of organizations, comprising:

receiving at a machine resident database system a request for a subscription, the subscription being associated with receiving, at a client machine, information related to a document stored on behalf of a first organization in a workspace at the machine, the client machine being physically distinct from the machine resident database system, wherein the workspace is associated with a level of access that allows access to multiple subscribers that are allowed to simultaneously access the document, simultaneously modify the document, and store the document, after being modified, as a master copy of the document at the machine resident database, the master copy not having a lock, the request including subscription information, the workspace and document are accessible only to subscribers associated with the first organization, the subscription being for a document stored within the workspace;

storing, at the machine resident database system, the request, the request being stored to a portion of the database system limited to information of the first organization;

querying the database system, for the subscription information for at least the first organization to determine whether a subscriber is to receive a copy of the document when the document is modified;

storing software on the machine resident database system, the software being for downloading by the client machine from the machine resident database system onto the client machine, the software including one or more machine instructions which, when implemented by the subscriber machine, establishes a hook that is triggered by opening the document, and as a result of being triggered, the hook causes a check to be performed to determine whether a document on the subscriber machine has been updated since the last time the document was opened by the subscriber;

receiving, at the machine resident database system, a request to download the software;

sending the software from the machine resident database system to the client machine;

after the sending of the software, receiving at the machine resident database, a request for information for determining whether the master document has changed since the other copy of the document stored on the client machine was created;

replacing, by the machine resident database system, the master copy of the document with a modified version of the document, wherein the modified version of document that replaces the master copy becomes the master copy of the document; and after the replacing, sending, by the machine resident database system, a copy of the modified version of the document to a subscriber having a subscription that requests copies of the document when the document is modified.

* * * * *